United States Patent [19]

Saunders

[11] Patent Number: 4,856,047
[45] Date of Patent: Aug. 8, 1989

[54] AUTOMATED REMOTE TELEMETRY PAGING SYSTEM

[75] Inventor: James R. Saunders, Humble, Tex.

[73] Assignee: BD Systems, Inc., Humble, Tex.

[21] Appl. No.: 44,511

[22] Filed: Apr. 29, 1987

[51] Int. Cl.⁴ .................. H04M 11/00; H04M 11/04
[52] U.S. Cl. ........................................ 379/57; 379/40;
379/41; 379/51; 379/106; 340/825.44
[58] Field of Search .................. 379/40, 57, 106, 107,
379/42, 43, 44, 50, 51, 37, 39; 340/825.44,
825.45; 455/54

[56] References Cited

U.S. PATENT DOCUMENTS

| | | | |
|---|---|---|---|
| 3,194,692 | 10/1965 | Seaborn, Jr. | 455/54 |
| 3,365,700 | 2/1972 | Cortmen et al. | 340/825.1 |
| 3,740,718 | 6/1973 | Melvin, Jr. | 365/219 |
| 4,172,969 | 10/1979 | Levine et al. | 417/564 |
| 4,339,746 | 7/1982 | Ulicki et al. | 379/50 |
| 4,549,044 | 10/1985 | Durham | 379/106 |
| 4,551,719 | 11/1985 | Carlin et al. | 340/825.36 |
| 4,577,182 | 3/1986 | Millsap et al. | 455/54 |
| 4,602,344 | 7/1986 | Ferretti et al. | 379/106 |
| 4,692,742 | 9/1987 | Raizen et al. | 379/40 |
| 4,703,325 | 10/1987 | Chamberlim et al. | 379/39 |
| 4,724,435 | 2/1988 | Moses et al. | 379/106 |

OTHER PUBLICATIONS

Command Communications Inc. brochure for ASAP Alert & ASAP-45 paging systems.

Motorola, Inc. brochures for "People Finder" paging system.

Primary Examiner—Jin F. Ng
Assistant Examiner—David H. Kim
Attorney, Agent, or Firm—Baker, Kirk & Bissex

[57] ABSTRACT

A remote telemetry unit (RTU) for use in an automated telemetry paging system for providing remote pager notification of changes in selected operating parameters measured at a specific site location. The selected parameters and the unacceptable changes therein are provided in the form of a plurality of electrical status signals each representative of one of the selected parameters. The RTU includes a programmed microprocessor, including data input/output circuits, a memory circuit, a central processing unit (CPU) and a real time clock. The RTU also includes a status signal receiving circuit for receiving and electronically isolating and digitally shaping the received status signals. An interrogation circuit controlled by the CPU scans the digital status signals, and a discrimination circuit controlled by the CPU reads the digital status signals and determines if a valid deviated or changed status signal is present. If a valid change has occurred, a formatting circuit controlled by the CPU format a digital message to indicate the site location and codes for indicating the changed status or deviation of the monitored parameters. The digital status signals are transmitted to appropriate pager communications equipment for display in remote paging devices.

31 Claims, 11 Drawing Sheets

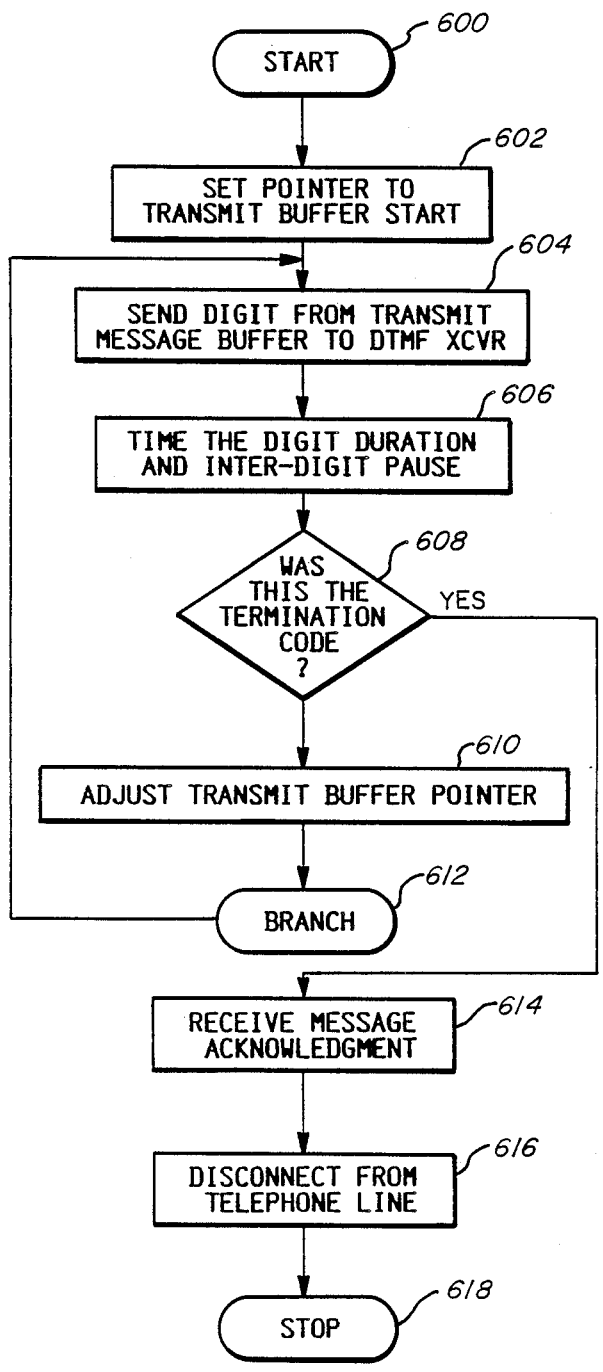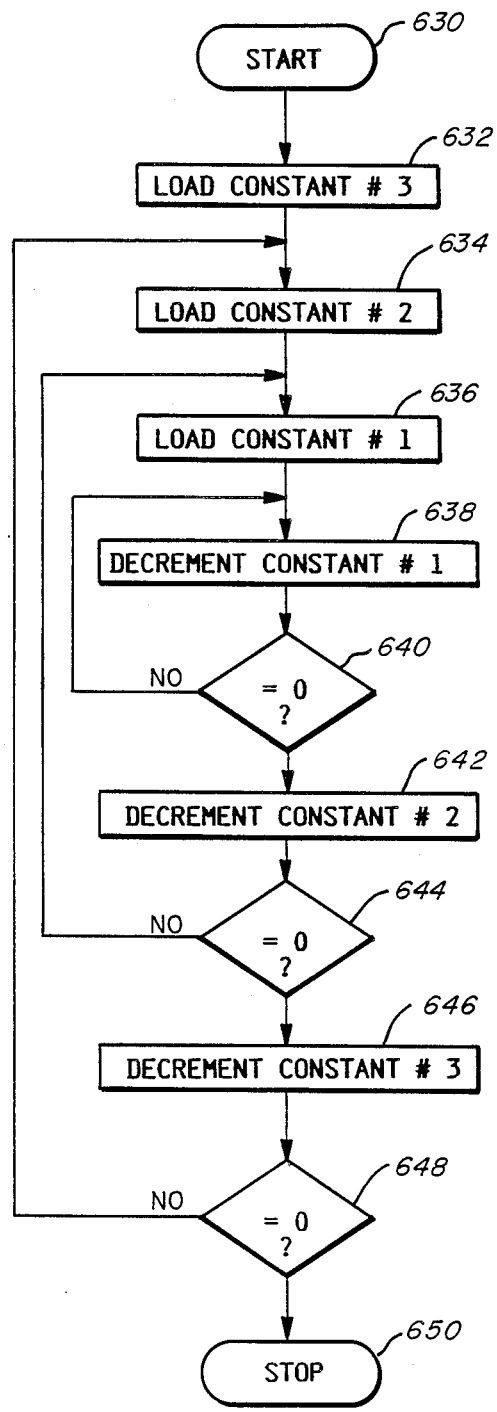
FIG. 21
FIG. 22

AUTOMATED REMOTE TELEMETRY PAGING SYSTEM

BACKGROUND OF THE INVENTION

This invention relates to paging telemetry systems, and particularly to an automated telemetry paging system that provides an on-site telemetry unit installed at a remote location for monitoring the status of selected equipment or process parameters and automatically communicating with selected remote telephone pager units to indicate the status of the monitored parameters and any unacceptable deviation therefrom.

In many industrial applications, especially where equipment and processes are located at remote geographical sites, it is not feasible to have maintenance personnel on site around the clock, yet it is necessary to monitor the operation of key equipment and process steps, including such items as pumps, generators, pipe line flow rates, pressures, level measurements, radio transmitting equipment, rotating equipment, mechanical flow and flow rates, temperatures and temperature limits, security and fire alarm systems, etc. The list of parameters and unacceptable deviations therefrom is almost inexhaustible.

There have been many systems designed for remote monitoring, ranging from monitoring at the remote site and radio telemetry communicating with a company central office to the more recent computer telemetry communications with central office, where maintenance or service personal would be dispatched when an alarm situation was detected. Most existing systems rely upon the central station concept where the primary mode of processing data involves a fixed central station computer which in turn imposes distinct limitations on "distributed" processing due to topological constraints imposed by any such central computer station configuration. In addition, such systems are elaborate and costly, often requiring expensive radio and/or computer transmitting and receiving equipment at both the remote site location and the central office monitoring station Further, time delays were often encountered at the central monitoring station in contacting supervisory and maintenance personnel due to using a separate telephone and/or paging communication system.

The automatic remote telemetry paging system herein disclosed obviates the need for central station computers by offering true remote distributed data processing means for allowing a broad range of topology choices in the communications system comprising a remote telemetry unit that can communicate directly with a human recipient through a pager or portable receiver and thereby redefine the central function locality in terms of the pagers which are in automatic direct communication with the remote site being monitored at all times.

Accordingly, one primary feature of the present invention is to provide a simple paging telemetry system that communicates directly over telephone lines to paging network equipment to designated pager units associated with selected supervisory and maintenance personnel.

Another feature of the present invention is to provide rapid wide area and repeated notification of an alarm situation to key personnel.

Still another feature of the present invention is to provide fully automatic dispatching of a coded pager message directly to key personnel via telephone paging units without central office intervention.

Yet another feature of the present invention is to provide a remote telemetry unit for on-site installation at the location for monitoring that requires only customer provided signals indicative of the parameter to be monitored, dedicated telephone lines and a source of electrical power.

Still another feature of the present invention is the use of VLSI digital logic and a machine code software program to keep the microprocessor memory requirements to a minimum.

Another feature of the present invention is the ability to stack alarms as they occur, even if a prior deviation alarm notification procedure has not yet been completed, and then provide alarm notification on a LIFO basis.

Yet another feature of this invention is the ability of the remote telemetry unit to transmit alarm messages and telemetry data to digital and alphanumeric display pager units.

Still another feature of the present invention is to provide automatic repeat dialing of selected pager numbers for insuring pager message delivery.

Yet another feature of the present invention is the provision of verification of the transmitted status message at the on-site remote telemetry unit.

BRIEF SUMMARY OF THE INVENTION

In accordance with one primary principle of this invention, in a telemetry paging system for providing remote pager notification of deviations in selected operating parameters measured at a specific site location wherein indication of each of the selected parameters and the unacceptable deviation therefrom is provided in the form of electrical status signals representative thereof, wherein telephone company connections to telephone control switching equipment for dialing selected telephone numbers is provided at the site location, and wherein pager network communications equipment is provided that is ,in communication with the telephone central switching equipment and in communication with a plurality of selected paging devices, a remote telemetry unit is disclosed comprising, telemetry means located at the site location and receiving the electrical status signals indicative of each of the selected parameters and any unacceptable deviation therefrom and in response thereto generating a status message identifying the remote site location and codes for indicating the deviated parameters and generating audio tone messages representative of the status message for communicating with telephone computer switching and paging equipment.

In accordance with another principle of the invention, the telemetry means comprises, status signal receiving means for receiving and isolating the signals received from the status means, the status signal receiving means isolating the signals for protecting the telemetry means from any spurious electrical spikes and overvoltage signal inputs, a programmed microprocessor (MPU) including memory means for receiving the status signals from the status signal receiving means, and digital to multiple frequency (DTMF) conversion means interconnected to the MPU for converting digital status message signals generated by the MPU to audio frequency signals for transmission over the telephone lines, and telephone interface means for interfacing between the digital to multiple frequency conversion means and the telephone company line interconnected to the telephone office switching equipment in response to control signals from the MPU for interconnecting audio frequency telephone signals to the telephone lines for application to the telephone company switching equipment and the pager network equipment.

In accordance with another principle of this invention, the MPU interrogates the received electrical status signals at a predetermined rate functionally related to the MPU clock rate and in response to the occurrence of a deviate status signal introduces a predetermined time delay before further comparing the status signals for comparison with a previously determined status reference maintained in the MPU memory for determining whether a deviate status signal is an unacceptable parametric deviation. The MPU in response to determining that an unacceptable status signal deviation has occurred generates a digital status message identifying the remote site location and the selected parametric deviation, and then energizes the telephone interface means when the digital status message is completed and dials preselected pager telephone numbers stored in the memory means through the telephone central switching equipment and pager network equipment. The MPU further applies digital signals representative of the digital status message to the DTMF conversion means for converting the digital signals to audio frequency signals for transmission over the telephone lines to the pager network equipment for broadcast to the pager devices for displaying the status message therein in a preselected format.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the accompanying drawings, which drawings form a part of this specification.

In the drawings:

FIG. 21 is a program flow chart diagram of the "transmit" routine of the "reporting cycle" function shown in FIG. 13.

FIG. 22 is a program flow chart diagram of a typical "delay" routine for use by the program shown in FIG. 13.

DETAILED DESCRIPTION OF THE INVENTION

Figures 1, 2:
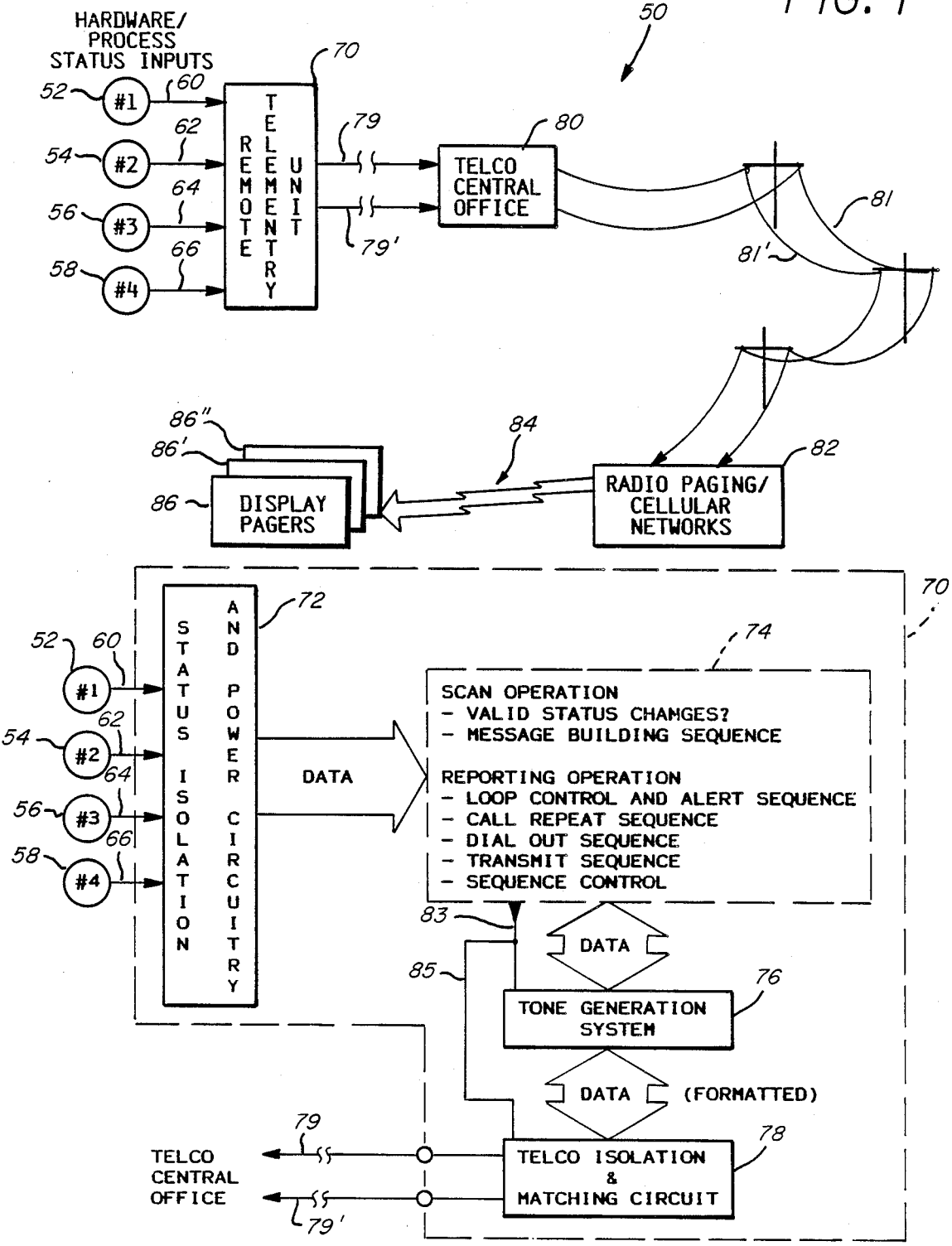
FIG. 1 is a functional block diagram of the remote telemetry paging system in accordance with this invention.
FIG. 2 is a functional block diagram of the remote telemetry unit, that controls the telemetry paging system shown in FIG. 1.

Referring now to FIG. 1, a functional block diagram of the remote telemetry paging system 50 is shown. Customer supplied status inputs 52, 54, 56 and 58 are furnished for indicating the status of a plurality of selected parameters and an unacceptable deviation from the parameters at a specific site. The status inputs are generated by dry contact closures (not shown) in a normally closed (n.c.) condition. The unacceptable deviation or change in the parameters would then be accomplished by the opening of the n.c. switch dry contacts. The dry contact closure status inputs may be provided by a wide variety of sensing devices to perform closed-loop monitoring of pumps, pressures, level switches, radio transmitting equipment, rotating equipment, mechanical motion, flow and flow rates, temperatures and temperature limits, security and fire alarm systems, etc.

For example, the site could be a remote oil well completion site (identified with a specific site ID) and the selected parameters 1–4 may be the status of each of four pumps, one for each well 52, 54, 56 and 58. In another example, the site could be a potable water well (identified with a specific site ID), and the status parameters desired to be monitored are well pump failure, water storage level "low," water storage level "high" and pipeline pressure "low." In yet another example of the flexibility of the invention, the site could be a group of buildings (identified with a specific site ID), and the monitored status inputs could be a specific building, a fire in the building and on an identified floor, the presence of combustible gas in the building on an identified floor, and an unauthorized intrusion in a specific building. While the types, sites and status of many combinations of equipment and/or processes may be unlimited, for simplicity, the following description of the preferred embodiment will be described with reference to a selected potable water well site, in which the status inputs 1-4 are identified as follows:

Status #1 (52)—Water well pump failure
Status #2 (54)—Water storage tank level low
Status #3 (56)—Water storage tank level high
Status #4 (58)—Water pipeline pressure low As hereinabove described, such status inputs (52, 54, 56 and 58) are electrical signal levels furnished by dry contact closures (not shown) in a "normally closed" (n.c.) condition, and are connected through wire pairs 60, 62, 64 and 66, respectively, to a remote telemetry unit (RTU) 70, located at the site of the potable water well system.

The status input signals (from parameters 52, 54, 56 and 58) from the monitored water well site are scanned or interrogated on a continuous basis and any changes in the status of the monitored equipment (or function) causes the RTU 70 to format a desired message and then to automatically dial predetermined telephone pagers and display the status message on the pager. As shown in FIG. 1, the RTU 70 output is connected to a conventional telephone company line pair 79-79' for interconnection to telephone central office dialing equipment 80. The RTU 70 will dial through the telephone office equipment 80, through appropriate telephone lines 81-81' to a selected radio paging/cellular transmitter network 82.

The RTU 70 sends the formatted status message via telephone lines 81-81' and the radio paging transmitters 82 to a plurality of pagers 86, 86' and/or 86" of selected maintenance and supervisory personnel, where the status message will be visually displayed for appropriate action. The displayed message includes complete information about the location (site), as well as the type of alarm. The notified maintenance or supervisory personnel can then take appropriate repair or corrective action to remedy the alarm situation.

The basic functions of the RTU 70 are shown in greater detail in FIG. 2. The dry-contact status indications 52, 54, 56 and 58 are shown applying their status indication signals via wire pairs 60, 62, 64 and 66, respectively, as an input to the remote telemetry unit (RTU) 70 to a signal conditioning and isolation circuit 72. The signal conditioning and isolation circuit 72 isolates the status signal inputs and shapes and buffers the input signals to provide valid data signals as an input to microprocessor unit (MPU) 74. The MPU 74 continuously scans the input status data from the input circuit 72 and determines if there are valid status changes, and if the status changes are valid, then MPU 74 shifts to a message building sequence. Once the message building sequence has been completed, then MPU 74 shifts to a reporting cycle which performs an alerting sequence for alerting the various designated pagers, a repeat alert control sequence for controlling the repetition of times that each pager will be alerted, a dial out sequence and a transmit sequence to send the information to the pagers as hereinabove discussed.

Data from the MPU 74 is applied to the tone generation system 76, where the formatted data is converted to generated analog tones and applied through the isolation and matching circuit 78 to the telephone company lines 79 and 79' to the telephone central office switching equipment 80 as hereinabove described with regard to FIG. 1. In addition, MPU 74 controls the tone generation system 76 and the telephone isolation and matching circuit 78 via control lines 83 and 85. The RTU 70 also requires a customer supplied source of 115 VAC, 60 cycle power (not shown).

Figure 3:
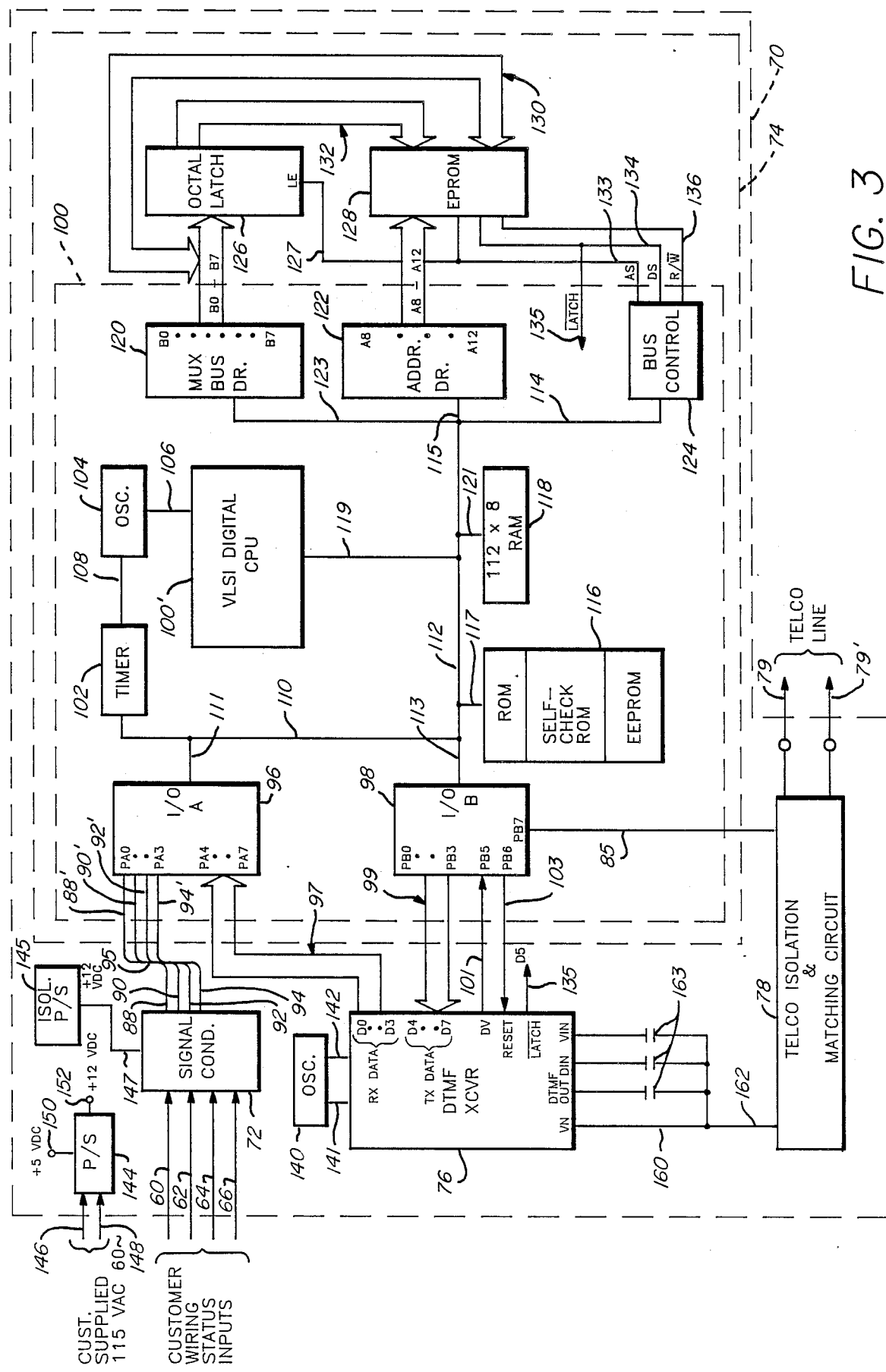
FIG. 3 is a schematic block diagram of the remote telemetry unit shown in FIG. 2.

FIG. 3 is a schematic block diagram of the RTU 74 as shown in FIGS. 1 and 2, hereinabove described in broad functional terms. The customer-furnished wiring for status inputs 52, 54, 56 and 58 are shown as conductor pairs 60, 62, 64 and 66. The status input signals are applied to the signal conditioning and isolation circuit 72, as hereinabove previously described. Customer supplied 115 VAC power (60 cycles) is applied via conductors 146 and 148 to a dc power supply 144 that supplies +5 VDC power via connection 150 and +12 VDC power via connection 152 to the RTU 74. The power connections to the internal circuitry of the RTU 70 and MPU 74 are not shown for simplicity. An internal isolated power supply 145 presents +12 VDC electrical power to circuit 72.

The outputs from the signal conditioning and isolation circuit 72 are applied as discrete data inputs 88, 90, 92 and 94, corresponding to the status line inputs applied through conductors 60, 62, 64 and 66, respectively, where they are applied through a conductor set 95 to an input/output (I/O) circuit A 96 as a part of the microprocessor (MU) unit 74.

The MPU 74 comprises a microprocessor 100, an octal latch circuit 126 and an erasable programmable read only memory (EPROM) 128. The microprocessor 100 comprises a VSLI Digital CPU 100', a timing circuit 102 and oscillator 104, the above-mentioned parallel I/O circuit A 96 and the second parallel I/O circuit B 98, an internal read-only memory (ROM) 116, a random access memory (RAM) 118, a multiplex bus drive circuit 120, an address bus drive 122, and a bus control circuit 124. The 8-bit output of the multiplex data bus drive circuit 120 is interconnected to one side of the octal latch circuit 126 and to one set of 8-bit ports in EPROM 128 by conductor set 130. The other side of the octal latch 126 is connected to a second set of 8-bit ports in EPROM 128 by the conductor set 132. The oscillator 104 is interconnected to CPU 100' by conductor set 106 and is also connected to the timing circuit 102, by conductor set 108. The oscillator 104 and timing circuit 102 are also connected to the parallel I/O circuit A 96 by conductor sets 110 and 111, and to the parallel I/O circuit B 98 by conductor sets 110 and 113.

The timer/oscillator circuits are also interconnected by conductor sets 110, 112 and 117 to the internal ROM 116, and by conductor sets 110, 112 and 119 to the CPU 100'. The timer circuit 102 is also interconnected by conductor sets 110, 112 and 121 to the RAM 118, and the conductor sets 110, 112 and 123 to the multiplex bus drive circuit 120. In addition, the timer circuit 102 is also interconnected by conductor sets 110, 112 and 115 to the address bus drive circuit 122, and via conductor sets 110, 112 and 114 to the bus control circuit 124.

The address bus drive circuit 122 applies its output A8-A12 as inputs to the EPROM circuit 128. The bus control circuit 124 applies an address strobe (AS) signal via line 133 as an input to the EPROM circuit 128, and via lines 133 and 127 to the octal latch circuit 126 at port LE. The data strobe (DS) signal from the bus control 124 is applied through line 134 to the EPROM 128, and via lines 134 and 135 to the LATCH input of the DTMF transceiver 76. In addition, a read/write (R/W) signal is applied from the bus control circuit 124 through line 136 to the EPROM circuit 128. The octal latch circuit 126 is interfaced between the multiplex bus drive circuit 120 and the EPROM 128 for controlling the 8-bit messages applied therebetween.

In addition, the remaining input ports of the I/O circuit A 96 (PA4–PA7) are interconnected via a conductor set 97 to receive data information from data ports (D0–D3) of the DTMF transceiver 76. Data ports (PB0–PB3) of the I/O circuit B 98 are interconnected to input ports (D4–D7) of the DTMF transceiver 76 by cable 99. The conductor sets 97 and 99 interconnecting the ports of the I/O circuit A 96 and the I/O circuit B 98 perform the function of data transmission between the MPU 74 and the tone generation system (DTMF circuit 76) as shown in FIG. 2. The I/O circuit B 98 is also interconnected to the DTMF transceiver by conductors 101 and 103 (forming the control lines 83 as shown in FIG. 2), as hereinabove described. In addition, another port PB7 of the I/O circuit B 98 is interconnected to the telephone company isolation and matching circuit 78 via control line 85. A separate oscillator circuit 140 is interconnected to the DTMF circuit 76 by means of conductors 141 and 142.

The DTMF circuit 76 is interconnected to the telephone company isolation and matching circuit 78 by means of conductors 160 and 162 for transmitting and receiving the audio frequency signals and data via the telephone isolation and matching circuit 78 to the telephone company central switching equipment as hereinabove described. Three of the ports (LIN, DIN and DTMF OUT) of the DTMF circuit 76 are connected in parallel through capacitors 163, the output sides of which are all interconnected to conductor 162, while the lead 160 is a direct application or connection between the DTMF transceiver 76 port $V_n$ and the isolation and matching circuit 78 as an ungrounded analog reference on a floated interface to circuit 78 and the telephone company tip and ring connections 79/79'.

The control and analysis algorithms for the microprocessor unit 74 are written in machine code language and executed by the 8-bit microcomputer chip 100'. The internal data transfers (signal DS) of the MPU 74 have been designed to operate at a 1 MZ rate. Signals are handled in sequential groups of eight parallel signals at a time. The use of the machine code programming technique results in very high speed processing and minimal memory requirements. For example, if the MPU 74 applications program was compiled from a high-level language such as C, PASCAL, or FORTRAN, such a program would occupy approximately 100 times as much memory when compared to the machine code approach utilized in this invention.

As previously described, the signal conditioning and isolation circuit 72 accepts the dry contact status input signals from customer selected and monitored parameters. Status inputs may be normally open, normally closed or mixed, if desired. However, in the present circuit description, we will assume that the dry contact closures for producing the status signals applied via the input pairs 60, 62, 64, and 66 are normally closed (n.c.) for allowing detection of a broken field conductor in conductor pairs 60, 62, 64 or 66 as a safety measure.

The RTU 70 requires only two additional connections to the telephone company lines. Terminations are provided for the standard telephone line tip and ring lines 79 and 79' In this way, any type of PBX, PABX or standard DDD telephone line service can be utilized. The operation of the RTU 70 and the MPU 74 will be described in greater detail hereinafter as the operation of the RTU 70 is described through its functional sequences.

Figure 4:
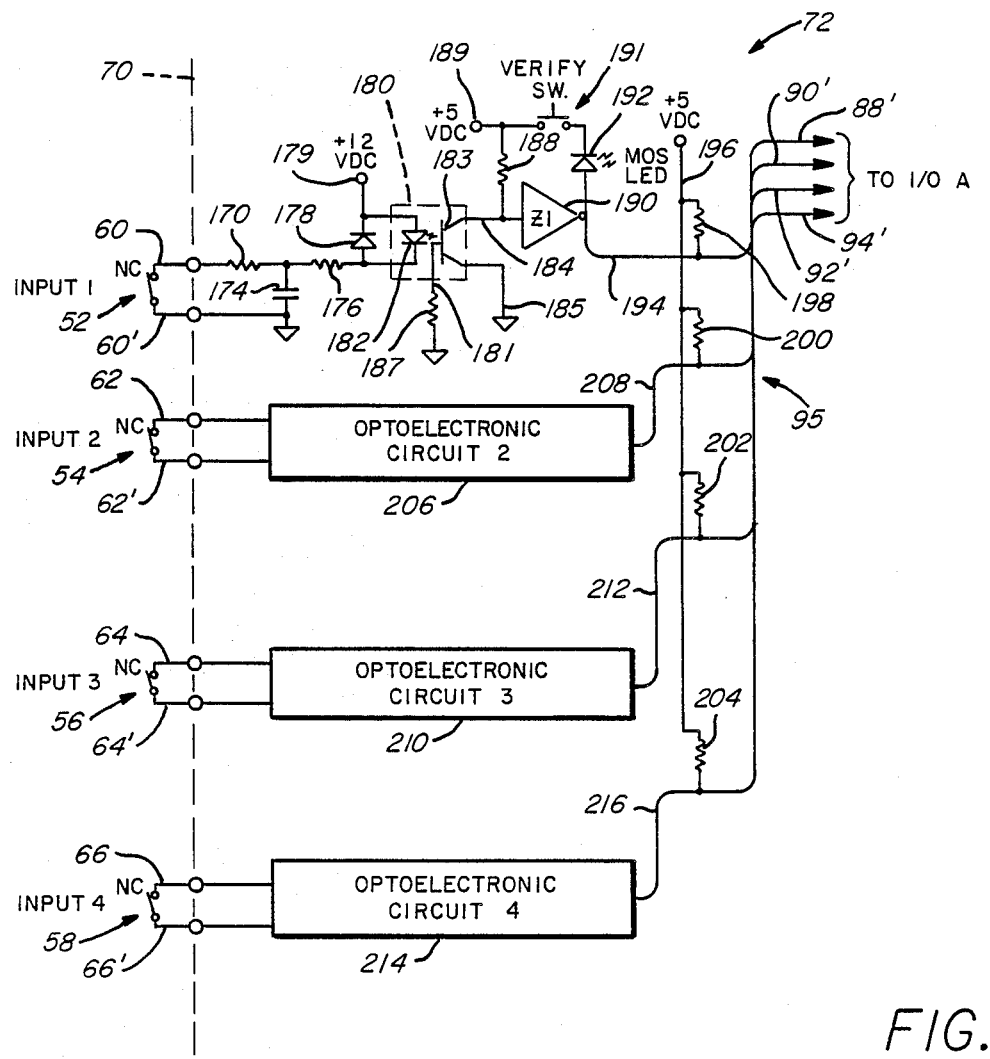
FIG. 4 is a schematic diagram, partially in block diagram form, of the signal status and conditioning network shown in FIG. 3.

FIG. 4 discloses circuit details of the signal conditioning and isolation circuit 72. As hereinabove described, the customer-supplied status inputs are shown utilizing dry contact switch closures (n.c.) 52, 54, 56 and 58, respectively. Since the input circuits are identical parallel circuits, only the conditioning and isolation circuit, associated with the n.c. contacts 52, is shown in schematic detail, with the other circuits 206, 210 and 214 shown only in a block diagram form. Since the circuits are identical, the description of the opto-electronic signal conditioning and isolation circuit associated with the first status input n.c. contact closure 52 will describe the identical circuit operations for opto-electronic circuits 206, 210 and 214.

The n.c. contacts 52 are connected to the input of the RTU 70 by conductors 60 and 60' and to an RC input network comprising resistors 170, 176 and capacitor 174 to one side of diode 178. The other side of diode 178 is connected to a source of 12 vdc power at 179. The RC network acts to protect the photodiode 182 from negative transient signals appearing on input line 60, while the diode 178 clamps positive input signals appearing on line 60 to a maximum value, in the range of +12.0 vdc to +12.2 vdc at the photodiode 182. The diode 178 is interconnected in reverse parallel relation to the LED 182 component of the optical coupling device 180. The photo transistor 183 is optically coupled to the LED 182 and its output is applied via conductor 184 as an input to a Darlington amplifier/ inverter circuit 190. The bias lead 181 from photo transistor 183 is applied through resistor 187 to ground potential. The emitter of photo transistor 183 is connected by conductor 185 to ground potential.

The input to the Darlington amplifier/inverter circuit will be "low" or 0 vdc when photo transistor 183 is conducting because of the voltage drop across resistor 188 which is interconnected to a source of internal +5 vdc at 189 and to the input lead 184 to the Darlington circuit 190. The inverted output of circuit 190 is then "high", or +5 vdc, and is applied through lead 194 as an output to conductor set 95, where the status signal is applied to one of the input ports of the I/O circuit A 96 (see FIG. 3) through lead 88'. If the monitored parameter status at input 1 changes, i.e., the n.c. contacts 52 are opened (thus indicating an unacceptable parametric deviation), diode 178 loses its electrical potential and ceases to conduct, thus removing electrical potential from and reverse biasing LED 182 of the optical coupling circuit 180, and the output of the photo transistor 183 goes "high". The Darlington amplifier/inverter circuit 190 now produces a "low", or 0 vdc output, which is applied to an input port of I/O circuit A 96 through lead 194, conductor set 95 and input lead 88. The output lead 194 is also connected to a source of +5 vdc power through a resistor 198 and conductor 196 for further digital definition or shaping of the +5 vdc or 0 vdc output signals from the Darlington circuit/inverter 190.

The output of the inverter circuit 190 is also connected through a MOS LED 192 to the +5 vdc source 189 through a "verify" switch 191. The MOS LED 192 also includes an internal flasher circuit for causing the LED to flash when forward biased. The switch 191 can normally be operated at any time to apply +5 vdc to one side of the MOS LED 192. If the dry contact closure 52 is in its n.c. condition, the output of the inverter 190 is "high" (+5 vdc) and the MOS LED 192 will be reversed-biased and will not flash. However, if contacts 52 are opened, the output of inverter circuit 190 will go "low" (0 vdc) and the MOS LED 192 will now be forward-biased and will flash if switch 191 is actuated. The flashing MOS LED 192 will thus visually indicate to service or maintenance personnel which status input has a changed status or an alarm situation.

Similarly, n.c. dry contact closures 54, 56 and 58 will close the status signal input circuits associated with optoelectronics circuits 206, 210 and 214, respectively, through input lead pairs 62-62', 64-64', and 66-66', respectively. Each of the optoelectronic circuits 206, 210 and 214 are also interconnected to the "verify" switch 191 through a MOS LED (not shown) for presenting a visual status change as hereinabove described. The outputs of the inverter circuits (not shown) of optoelectronic circuits 206, 210 and 214 are applied through leads 208, 212 and 216 to the interconnecting conductor set 95 for applying the other status signal inputs to additional ports of the I/O circuit A 96 via input leads 90, 92 and 94, respectively. Similarly, the output leads of the inverter circuits of the optoelectronic circuits 206, 210 and 214 are interconnected to a +5 vdc source through resistors 200, 202 and 204, respectively.

The optical coupler circuit 180 is used in the signal conditioning and isolation circuit 72, coupled with an isolated source of +12 vdc power 145 (see FIG. 3) to eliminate unwanted stray over-voltage electrical signals or spikes that can damage the MPU 74 logic circuitry. Such over-voltage spikes are commonly encountered in many industrial field applications where stray and spurious voltages from other contact closures controlling and servicing pumps, pressure vessels, pressure and limit or level switches, etc. are picked up by the status input lead pairs 60, 62, 64 and 66 within common electrical conduits shared with other electrical power and control lines. In operation, the LED 182 component of the optical coupler 180, and its input diode 178 and RC input network act as the load for the isolated +12 vdc power supply 145 (see FIG. 3), and unwanted field spikes and over-voltage signals are routed to the power supply and the LED 182 which can absorb short duty cycle transient signals and inductive over-voltage signals. Further, by controlling the current transfer ratio between LED 182 and photo transistor 183, and taking into account the inherent hysteresis of the optical coupler 180, the resultant output of photo transistor 183 is a smooth, noise-free signal for application to MPU 74.

Figure 5:
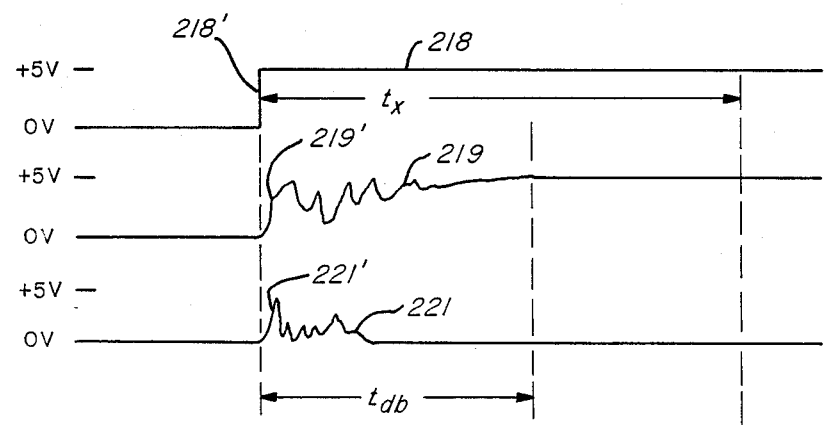
FIG. 5 is a graphical representation of the delay function used in determining the validity of a desired status input signal from a monitored station.

Referring now to FIG. 5, different types of input status signals that may be applied through the input signal conditioning and isolation circuit 72 are shown. Any signal fluctuations such as a sharp square-wave triggered signal 218, or a noisy signal 219 or a burst of noise 221 on any of the input line pairs 60, 62, 64 and 66 will initiate a timing sequence in response to the leading edges thereof (218', 219' and 221'), which will defer further interrogation or scan readings for a#user-specified period of time ($t_x$) ranging from milliseconds to several minutes. The purpose of this time delay is to eliminate transients and noise which may periodically appear on the input lines and is tailored to the characteristics of the various input signalling devices, and any "chatter" or "bouncing" that may be present will have time to settle down. The time delay $t_x$ includes a minimum "debounce" time $t_{db}$ which permits the "trigger" signal, if noisy, to "debounce" or "settle down" to a steady state signal. At the end of the time delay $t_x$, the status inputs are checked again, and if a "status" "changed" or a "deviation" still exists, it will now be considered a valid input status signal and a reporting sequence will begin. In the status input signals shown in FIG. 5, when the signals 218, 219 and 221 are again checked at the end of the time delay tx, only the signals represented by waveforms 218 and 219 will be considered valid input status signals. The status of the signal represented at 221 will not have changed at the end of time delay $t_x$, and, therefore, will not be considered a valid status signal change.

Figure 6:
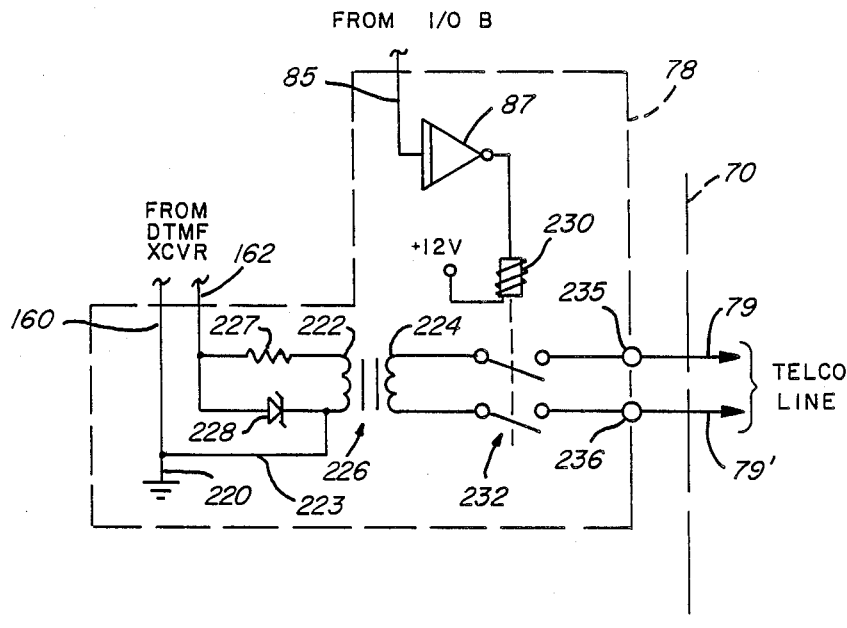
FIG. 6 is a schematic diagram of one embodiment of the telephone isolation and impedance matching circuit shown in FIG. 3.

The circuit details of the telephone isolation and matching circuit 78 are shown in FIG. 6. A conventional impedance matching and transformer circuit 226 is employed to match the impedance of the analog output and input lines 160 and 162 from the DTMF transceiver circuit 76 with the telephone company lines 79 and 79'. The transformer circuit 226 has a winding 222 that is interconnected to the DTMF circuit 76 line 162 through a parallel circuit comprising resistor 227 and a Zener diode 228. The side of the transformer winding 222 that is connected to the diode 228 is also interconnected to logic ground potential 220 and to the other DTMF circuit 76 line 160 by conductor 223. The other transformer winding 224 is connected to a pair of relay contacts 232 and is controlled by the hook relay 230.

The hook relay 230 is energized in response to a control signal applied thereto via conductor 85 and Darlington driver 87 from the I/O circuit B 98. The relay contacts are interconnected to terminals 235 and 236 and to the telephone company lines 79 and 79'. When the hook relay 230 is actuated, RTU 70 microprocessor 74 and DTMF transceiver circuit 76 are connected, through the isolation and impedance matching circuit 78, to the telephone company central office equipment 80 (see FIGS. 1 and 3) via conductors 79 and 79' for implementing the dialing and data transmission functions of the system.

The MPU 74 has been programmed to operate through the following functional sequences:

SCAN OPERATION

Input Capture
Comparison
Deviation Triggers (If valid status charge)

Message Building Sequence
    Single Digit Point Number Formatting
    Two Digit Point Number Formatting
    Post New Status

REPORTING OPERATION

Loop Control Sequence
Alert Sequence
Call Repeat Sequence
    Dial Out Sequence
    Transmit Sequence
    Sequence Control In describing the operation of the MPU 74 below, the above listed operational sequences will be followed:

SCAN OPERATION

Referring now to FIGS. 1-6, the "scanning mode" or "scanning function" is automatically invoked upon power-up or restart of the MPU 74. In this mode, status input signals via lines 60, 62, 64 and 66 are isolated, shaped, and buffered by the signal conditioning and isolation circuit 72. The status input signals are applied as inputs to the microprocessor 74 through parallel I/O "A" circuit 96 ports PA0-PA3 via conductors 88', 90', 92' and 94'. Additional inputs to I/O "A" 96 are received from the DTMF transceiver circuit 76 ports D0-D3 through I/O ports PA4-PA7. The parallel I/O "B" circuit 98 applies outputs from ports PB0-PB3 to DTMF circuit 76 ports D4-D7.

Figure 7:
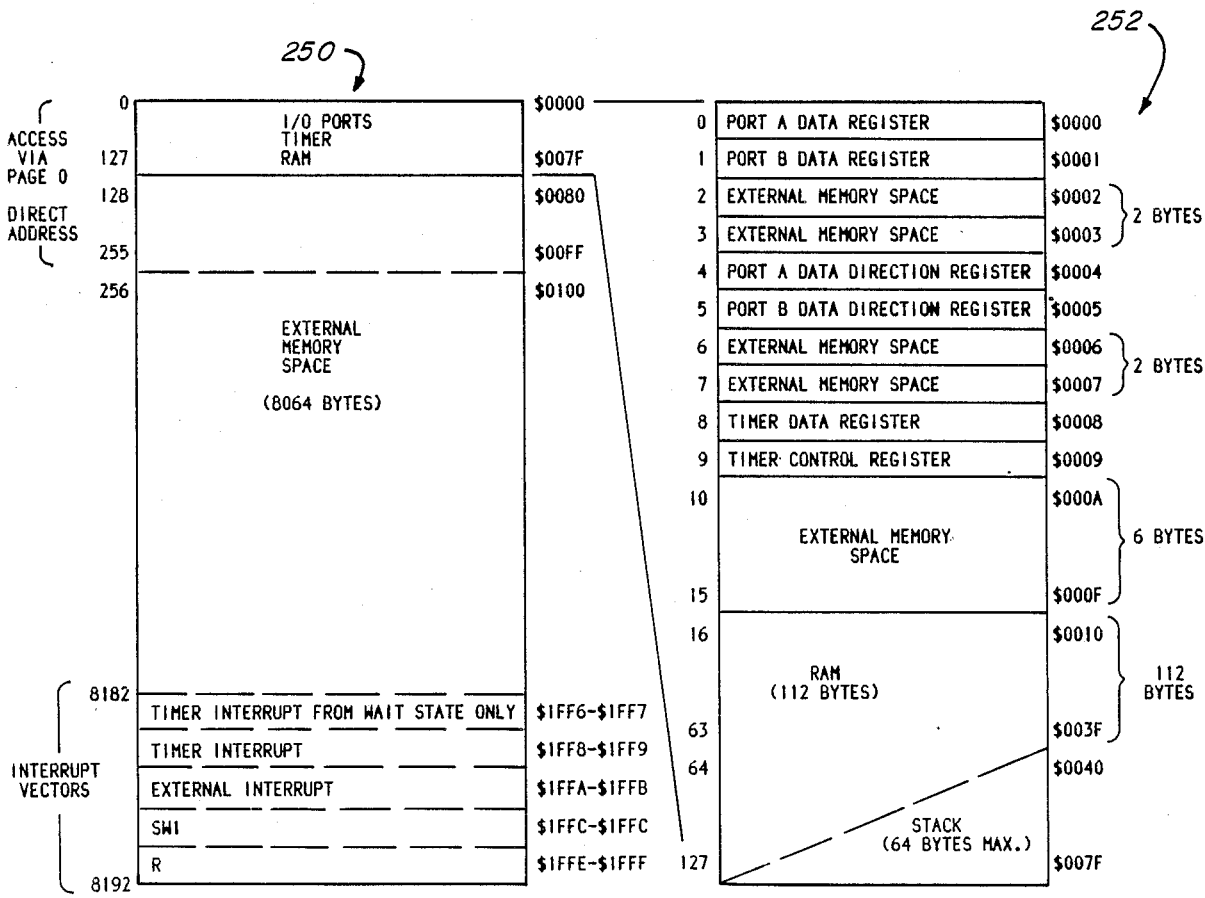
FIG. 7 is a memory address map diagram of the microprocessor unit (MPU).

FIG. 7 is an illustration of the MPU 74 memory address map 250, wherein the portion designated 252 is a more detailed breakdown of the addresses for that portion of the MPU representing the I/O "A" and "B" circuit ports, the timer and RAM memory addresses.

Figure 8:
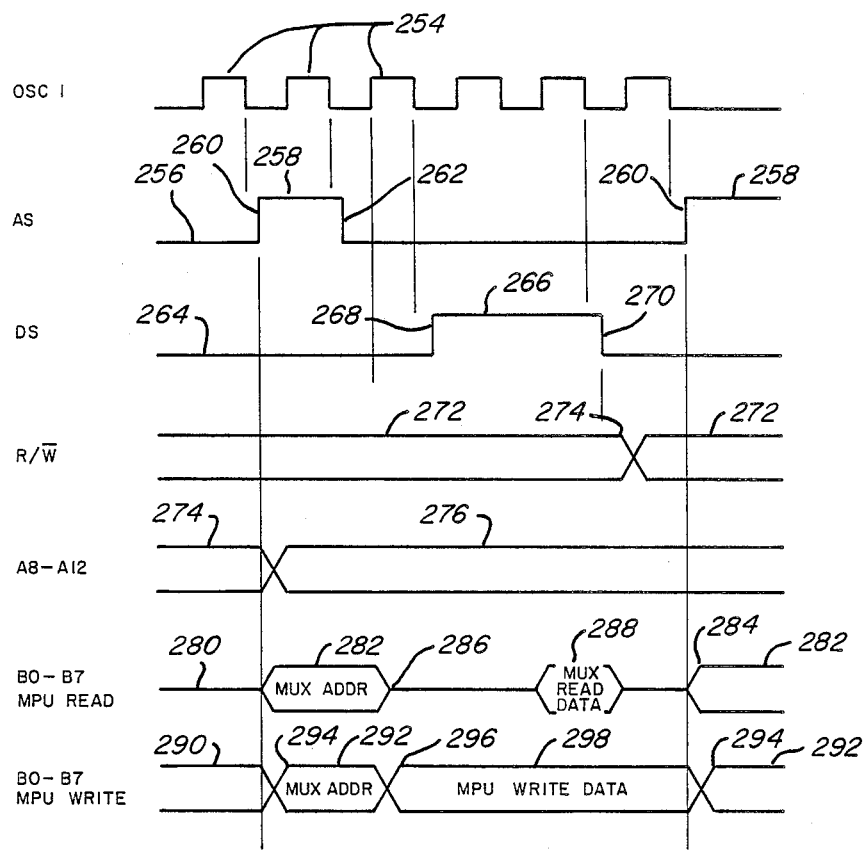
FIG. 8 is a signal timing diagram showing the time relationship between the MPU oscillator, the bus control circuit signals and the address bus drive and multiplex address/data bus drive circuit input/outputs.

In FIG. 8, the relationship of the oscillator 104 clock pulses to the bus control circuit 124 "strobe" signals, i.e., the address strobe (AS) and the data strobe (DS), the read & write (R/W) control signals, and the gating of the address driver 122 and multiplexer bus driver 120 input/output ports is shown. The oscillator clock pulses 254 are shown at the top of the figure and it is the trailing edge of the clock pulses 254 that trigger the strobe signals. As may be seen, the AS signal moves from a 0 vdc (256) to a +5 vdc "strobe" signal (258), with the leading edge 260 occurring slightly after the trailing edge of the clock pulse 254.

The trailing edge 262 of the AS signal occurs slightly after the trailing edge of the next oscillator clock pulse 254, the time delay being fixed. The leading edge 260 of the AS signal 258 strobes the address driver 122 outputs A8-A12 (276). The AS signal 280 also strobes the octal latch 126 and permits the multiplexer bus driver 120 to address the B0-B7 outputs. The leading edge of the next oscillator pulse 254 after the trailing edge 262 of the AS pulse 258 switches the multiplexer bus driver 120 address ports B0-B7 as shown at 286 and 296. A trailing edge of the next oscillator pulse 254 triggers the leading edge 268 of the data strobe (DS) pulse 266. The occurrence of the trailing edge 270 of the DS pulse 266 changes the state of the read/write (R/W) signal 272 at 274, and permits MPU 74 data appearing at the B0-B7 ports to be read as shown at 288. However, the MPU 74 write function is gated open at 296 and closes at 294 upon the occurrence of the leading edge of the next AS pulse 258. If the oscillator pulses 254 have a frequency of 5 MHz, the AS and DS pulses 258 and 266 have a frequency of 1 MHz and permit the interrogation of the status inputs to I/O "A" (96) to occur some 38,462 times per second.

Figure 9:
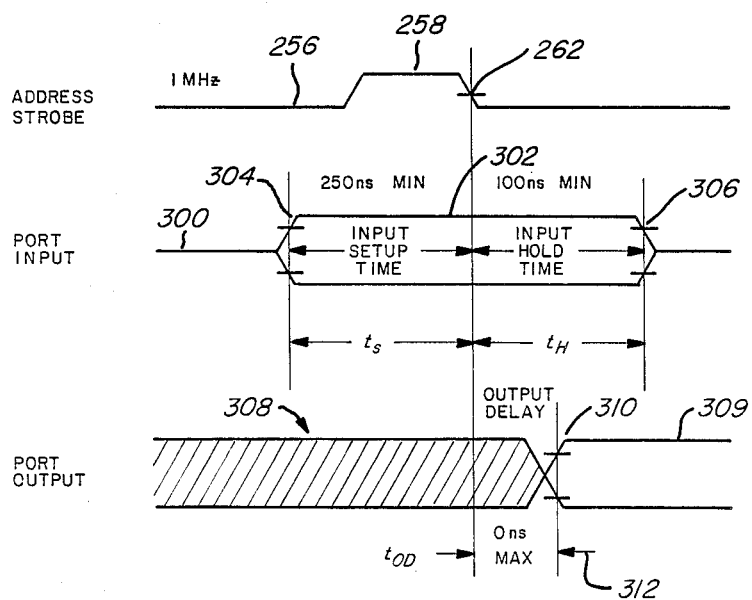
FIG. 9 is a signal timing diagram showing the timing of the input/output ports of the MPU I/O circuits.

FIG. 9 shows the timing of the I/O "A" and "B" (96) (98) ports with relation to the AS signals 258. The timing of the MPU circuit 74 has been selected to provide AS signals at a 1 MHz frequency, with the oscillator pulse frequency 254 selected at 5 MHz as above described. The AS signal is low at 256 and then goes high to produce the "strobe" signal at 258, which has a trailing edge at 262. The I/O port inputs at 300 open at 304 a minimum of 250 nanoseconds (input set up time), $t_s$, prior to the occurrence of the trailing edge 262 of the AS pulse 258. The open port at 302 remains open after the occurrence of the trailing edge 262 of the AS pulse 258 for a minimum of 100 nanoseconds (input hold time), $t_H$. The I/O port outputs have data available (see the shaded area 308) and the ports open at 310 with an inherent output delay, $t_{od}$, occurring after the trailing edge 262 of AS pulse 258. The $t_{od}$ delay time varies for different MPU 74 chip designs, but in the microprocessor chip selected herein for the MPU 74 (preferably a Motorola MC146805), the $t_{od}$ at 312 is specified as 0 nanoseconds maximum, and the I/O port is open as at 309.

Input Capture.

The complete status of the monitored functions provided by the input signals appearing at 60, 62, 64 and 66 is brought into the MPU 74 every 26 microseconds as determined by the system clock (timer 102 and oscillator 104). By taking 38,462 readings per second, the SCAN operation provides "continuous" monitoring of the then current status of any input signals appearing on the received lines. Should any changes or deviations status occur on the monitored lines, they will be immediately stored in RAM 118 for processing during the "comparison" sequence. This rate of capture is maintained as long as the inputs are stable.

Comparison.

Input status values appearing at 88', 90', 92' and 94' are compared against a reference field from RAM 118 every time they are acquired (38k/second). The reference field is the status value stored in RAM 118 at the last reporting sequence. If the two values correspond, then that particular input pattern has already been reported and the SCAN operation continues until a difference or deviation is detected. The compare sequence is performed every 26 microseconds, or once with each input reading. The actual comparison operation consumes 6 microseconds.

Deviation Triggering.

Part of the sequence includes a "masking" sequence in which specified inputs are ignored, or excluded from the comparison in the EPROM 128. These are inputs which the customer has determined should not trigger a reporting sequence but should be included in reports generated by the other, active, inputs. The remaining, unmasked inputs are treated as "triggers". Any triggering signal isolated and conditioned by circuit 72 and applied to MPU 74 on lines 88', 90', 92' and/or 94' (see FIGS. 4 and 5), such as one of the signals 218 or 219 (FIG. 5), will start the time delay $t_x$. At the end of the time delay $t_x$, the inputs are again checked. If the deviation still exists, it is considered a valid input signal and the message building sequence will begin. On the other hand, if the time delay $t_x$ is triggered by the burst of "noise" shown by the signal trace 221 of FIG. 5, then when the time delay $t_x$ elapses, the "deviation" or "change" will not be present and the triggering signal will not be considered a valid input signal, and the comparison sequence resumes. If a valid status change has occurred, then the MPU 74 proceeds to the message building sequence.

Message Building Sequence.

This sequence creates a message for display on the pagers 86 in which the "high" or "active" inputs are indicated by digits separated by dashes, and ending in a paging message termination code. When a "triggering" signal has occurred, the inputs are read again after the time delay, $t_x$, as described above. An input that is "valid" will trigger the message building sequence. During the message building operation, each input is again examined one at a time. This time, no comparison to the status reference pattern is made, but the purpose is to determine specifically which inputs are active (have a change or deviation) and to assemble a listing of those status point numbers.

Figure 10:
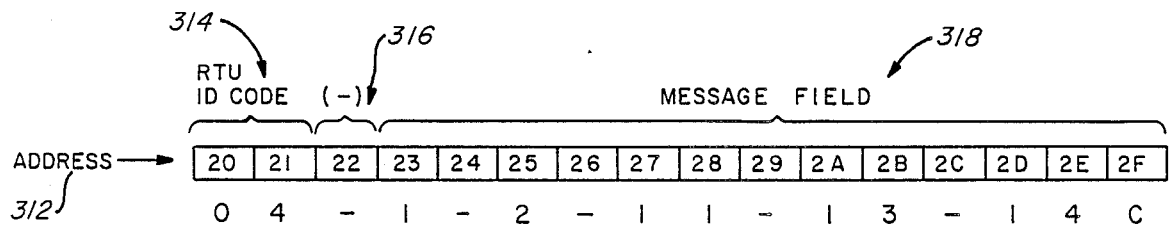
FIG. 10 is a diagram of the transmit buffer as structured for the pager message.

FIG. 10 illustrates the transmit buffer address structure 312 for "holding" the bytes that make up the pager message. The first two address bytes 314 of the message memory in RAM 118 are reserved for the RTU identification code to identify the "site" where the RTU 70 is located and functioning. The third byte address 316 is reserved for a dash to separate the RTU ID. NO. from the remaining part of the message. For the message field 318, up to about 25 bytes of memory are reserved for assembling the message for display on the pagers. In FIG. 10, the message example shown is:

04-1-2-11-13-14C

The "04" portion of the message identifies the RTU and the site location. The remaining numbers are codes, indicating "active" or "deviations" in a status parameter. The "C" occurring at the end of the message is a termination code for alerting the MPU 74 that the entire message has been completed when transmitted.

Using the above-described embodiment where the RTU is monitoring a portable water facility, it may, for example, have a fixed RTU ID NO. of 11, corresponding to well #11. The pager message format for this unit could be as follows:

| | |
|---|---|
| 11-1 | indicates well #11 pump failure |
| 11-2 | indicates well #11 storage-low level |
| 11-3 | indicates well #11 storage-high level |
| 11-4 | indicates well #11 pipeline pressure failure |
| 11-1-2-4 | means well #11 has pump failure, low storage level and low pipeline pressure |

| WELL # | STATUS |
|---|---|
| XX - | X-X-X-X |

An all clear (all points normal) is shown by reporting the RTU ID code only. For example:

| 11 | Well #11 all clear. |

For a single point in an alarm, the pager will read the site code (RTU ID), a dash and a point number. Example:

| 11-3 |

For multiple points in an alarm, the pager will read the site code (RTU ID), followed by the point numbers in ascending numerical order separated by dashes:

| 11-1-3-4 | three points in alarm |

When there is more information that can be shown in one display, the pager stores this as two passes on the same display:

| 52-1-3-6-8-9c | first display "c" means "continued" |

| -10-11-16 | second display |

For alarm point restorals, when a status point is returned to its normal status, a message is formatted with that point number deleted. For example:

| 11-1-3-4 | last report, 3 points in alarm |

| 11-3-4 | new report; status point #1 has been restored |

The pagers 86 that are used today have been designed to hold multiple messages, so

| 11-1-3-4 | can be checked against

| 11-3-4 | to confirm that status #1 restoral caused the current report. In fact, a minimum of four lines are usually offered in the pager's memory. Up to 8 lines are currently available, with more memory planned by manufacturers for future pagers.

Stacked alarms occur when there are status changes or deviations that occur during a reporting sequence. These new changes would not be included in the current reporting cycle. However, because the current status image of lines 88', 90', 92' and 94' being reported is the next reference pattern stored in RAM 118, upon completion of the reporting cycle, the SCAN operation will recognize the new changes or deviations as different from the just reported status. Therefore, another reporting cycle will be initiated and the current status will be sent to the pagers 86, and established as the next status reference pattern in RAM 118. Stacked alarms generate their own "alert" sequences. All status changes are sent to the pagers 86, regardless of when they occur.

In the message building sequence, the following functions occur:

Single Digit Point Numbers.

Each of the status 88', 90', 92'and 94' are individually examined one at a time to determine their state. For each one that is high, a digital signal is generated to identify the status point, and a corresponding single digit (preceded by a dash) will be entered into a transmission buffer or message buffer in RAM 118 (see FIG. 10).

While assembling the transmit message, all inputs are handled in ascending numerical order by the CPU 100' and EPROM 128. When all of the active points have been mapped, the digital code for termination is entered as the last character in the transmit message. This character serves to terminate the transmitting sequence as well as acting as a signal to the paging computer indicating that a particular data transmission is complete.

Two-Digit Point Numbers.

In the system herein described, consisting of only four status inputs, the status input lines 60, 62, 64 and 66 from the customer's equipment can be examined and identified by a single digit as above described. However, if the inputs were greater than 9, the inputs would be examined similarly to the single-digit inputs, and for each of these, a digital signal consisting of two digits will be generated and the appropriate codes will be entered into the transmit message buffer of RAM 118, again preceded by a dash code for clarity on the display pager.

Posting New Status.

The final task of the message building sequence is to post the current status of the inputs 88', 90', 92' and 94'. This input pattern of the current input status posted in RAM 118 then serves as the status reference for subsequent SCAN operations. Moving the complete input pattern into the reference cells of RAM 118 takes 14 microseconds to complete, and, among other things gives the CPU 100' the ability to report status restorals when an activated input returns to its normal state.

REPORTING OPERATION

The "Reporting Operation" is responsible for dispatching system alarm messages to the paging computers. During this operation, the contents of the transmit message buffer (RAM 118) are shifted out as a series of tone signals with precise frequency, duration and duty cycles by DTMF circuit 76. These tone bursts are set up for compatibility with the computers employed by the various commercial paging services.

Loop Control and Alert Sequence.

The "alert" sequence can consist of a series of telephone calls to different pager numbers that have been preselected and stored in EPROM 128. One pass through all the programmed phone numbers is called a loop. The customer can specify that the list be run a number of times for each triggering event at the remotely monitored site. This is usually done as a safety/redundancy measure to ensure that status reports reach the intended person through his pocket pager. There is no restriction on the length of the telephone list. The RTU 70 can be programmed for up to 256 loops with no modification.

Call Repeat Sequence.

Each telephone number in the list is programmable for up to 256 calls per pass within the loop. This is useful where a supervisor wants his pager to be notified once per alarm, but his technicians are to be called multiple times per alarm. As an example, the chosen maximums for calls may be:

15 phone numbers in the list
256 repeat calls per phone number
256 loops through the list Once triggered, the MPU 74 will call every phone number in the list the programmed number of times without interruption. If new status changes occur before the reporting sequence is completed, this will initiate a new round of reports to reflect the latest status.

Dialing Out Sequence.

When the MPU 74 has determined that a valid alarm exists, a message will be prepared as described above and contact with the paging computer will now be established.

A repeat counter in CPU 100' is loaded to indicate how many times the particular paging computer is to be called. The DTMF circuit 76 is RESET by a control signal from I/O "B" circuit 98 port PB5, and the hook relay 230 is energized to close contacts 232 and connect the DTMF circuit output lines 160 and 162 to the telephone lines 79-79' through the conventional impedance matching and isolation transformer circuit 226. Once the hook relay 230 is energized, and the RTU 70 connected to the telephone line, a short (approximately one [1]second) delay is utilized to establish the telephone company dial tone and to stabilize the telephone line.

The telephone number is then dialed by presenting a digital code from I/O "B" circuit 98 to the DTMF circuit 76 and issuing RESET and LATCH signals to DTMF circuit 76 to commence the gating of I/O B circuit 98 output ports PB0-PB3 to the receive ports D4-D7 of the DTMF circuit 76. The DTMF circuit 76 converts the transmitted data from I/O B circuit 98 to analog signals for transmitting as DTMF OUT signals via line 162 to the telephone office central equipment 80 (see FIG. 1). The outbound tone representing the telephone number digit will be timed to satisfy telephone central office equipment requirements and a pause will then likewise be inserted. Each digit of the telephone number will be handled in this manner until CPU 100' and the DTMF 76 have dialed all digits of the telephone number.

Any number of digits may be set up, permitting the RTU 70 to drive any kind of PBX, PABX or long distance telephone service, including billing codes if required. In this way, a worldwide monitoring network can readily be set up; i.e., refineries or pumps or secure areas in an overseas area can be monitored in the United States as well as in the remote site area. When the complete telephone number has been dialed, the MPU 74 will wait for acknowledgement from the called paging computer 82 (see FIG. 1) before sending any information. Speed dialing is the normal mode of operation.

Data Transmission.

After the paging computer in network 82 answers the telephone call, the DTMF circuit 76 will send a variable-length tone-encoded message via line 162. This message will include the status point numbers for all active inputs separated by dashes. A two- (or three) digit RTU ID code is transmitted first, and is used to indicate the customer-assigned site number (see FIG. 10). The site code is sent with every transmission and does not change. However, the balance of the message will be a function of the status input states of lines 60, 62, 64 and 66 and may change with each alert sequence. The speed of the data transmission will be more than double the dialing speed, and is generally not decipherable by ear. The MPU 74 will drive the paging computer at its fastest acceptable data input rate (approximately 175 digits per minute). The duration of each digital tone burst and the inter-digit pauses are controlled by the MPU 74 and DTMF circuit 76.

Figure 11:
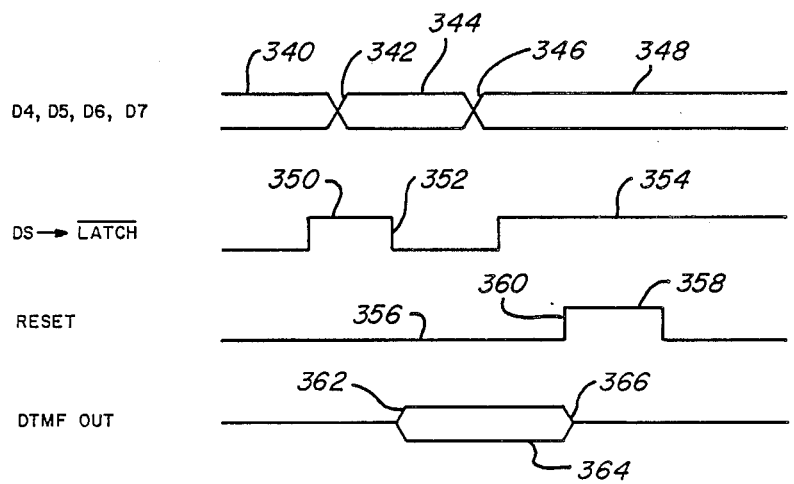
FIG. 11 is a signal timing diagram showing the relationship of the telephone company equipment status signal tone burst received by the DTMF transceiver and the data valid signals.

FIG. 11 shows the timing sequence between the DS signal (also $\overline{\text{LATCH}}$ signal) and the RESET signals applied to the DTMF circuit 76 by the MPU 74. With data appearinq at DTMF ports D4-D7 as shown at 340, 344 and 348, the $\overline{\text{LATCH}}$ (DS) signal 350 trailing edge 352 will start the transmission of the analog signals via the DTMF out line 162 as shown at 362. However, when a RESET signal 358 occurs, its leading edge 360 will stop the DTMF OUT signal transmission as shown at 366, and provides a DTMF tone signal window 364 for the transmission of the DTMF tone frequencies generated by the DTMF circuit 76.

When the termination code is sent, two things happen. First, the MPU 74 resets the DTMF circuit 76 by sending a RESET signal from I/O "B" circuit 98, and the MPU 74 stops sending data. Second, the receiving computer recognizes the termination code and emits a series of 1400 Hz acknowledgement tones.

Sequence Control.

After the MPU 74 acknowledges the receipt of the 1400 Hz tones by the DTMF circuit 76, MPU 74 de-energizes the hook relay 232 and decrements the call repeat counter. If the counter is not zero, another call to the same phone number is initiated and the alarm message is sent again. When the call repeat counter reaches zero, the next telephone number in the list is called and data is transferred as above described. When the last phone number in the list has been called, the loop counter is decremented. If it is not zero, the entire list is called again, just as before. When the loop counter reaches zero, the MPU 74 resumes the SCAN operation and again watches for status changes occurring on input lines 60, 62, 64 and 66.

Figure 12:
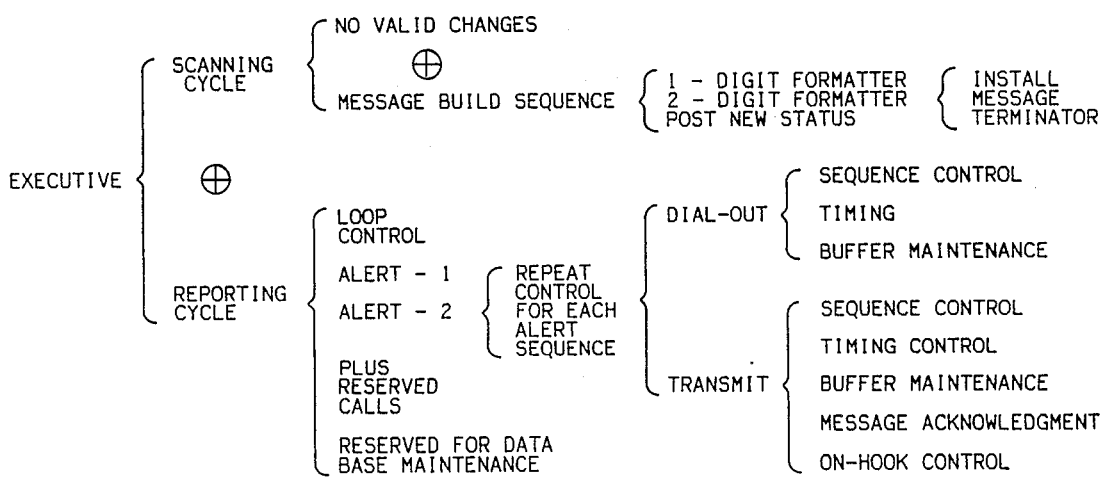
FIG. 12 is a Warnier functional diagram of the software program functions of the remote telemetry paging system.

FIG. 12 is a Warnier diagram of the software programs that control the functions of the RTU 70. The program routines or sequences progress from left to right and from top to bottom in sequence. The "+" symbols indicate an "exclusive OR" function between the Scanning Cycle and the Reporting Cycle, as well as between the Valid Change Sequence and the Message Building Sequence. However, each of the operations and sequences are also shown in conventional program flow chart diagrams in FIGS. 13-22. The sequences of the programs starting with the Executive Routine will now be described.

Figures 13, 14:
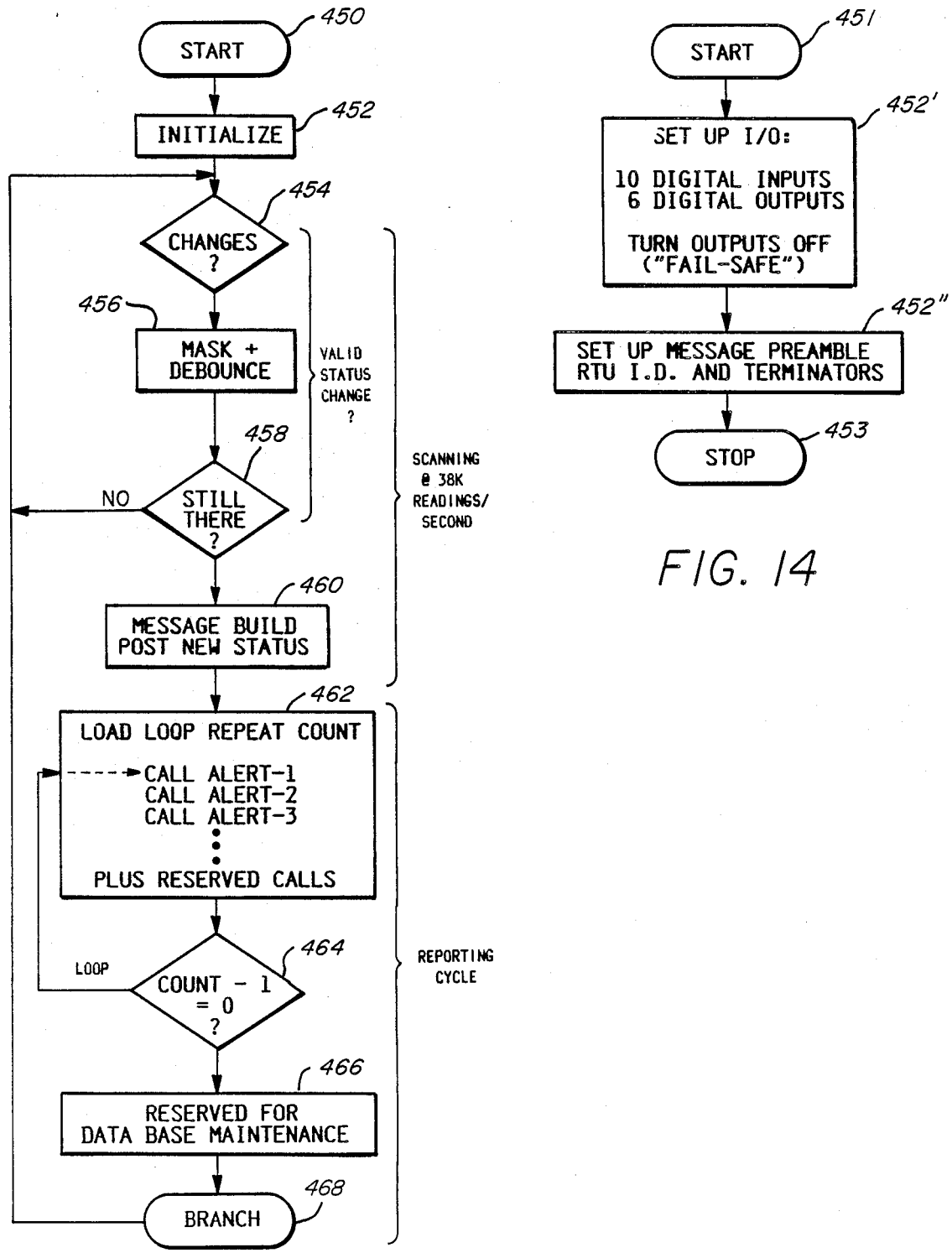
FIG. 13 is a program flow chart diagram of the basic "executive" function of the remote telemetry unit software program.
FIG. 14 is a program flow chart diagram of the basic "initialize routine" of the "executive" function shown in FIG. 13.

Referring to FIG. 13, the Executive Routine starts on power up at 450 and initially performs an initialize subroutine at 452 of setting up the microprocessor hardware and initializing all software reserved memory bytes to their referenced states, in addition to ordering the sequence of the subsequent control routines. After the initialize step 452 is completed, all of the input lines or points are examined and compared at step 454 for any changes from the last previous status state. If no changes are detected, the scanning continues for examining all of the input status lines. If a change or deviation is detected, the next step of reviewing the mask and providing a debounce delay time is accomplished in step 456 and then a subsequent examination step at 458 is again accomplished. When no valid status signal is present, the loop is returned to step 454 for continued scanning and monitoring.

If, however, a valid status change signal has been determined at step 458, then the program moves to the next step 460 which is that of the message building routine, which will be hereinafter described in greater detail. After the message building routine has been accomplished, the posting of a new status to the RAM 118 is accomplished and the Executive Routine moves to the reporting cycle in step 462 which begins the alert routine. In subroutine 462, the loop repeat counter is loaded corresponding to the number of loops that the alerting sequence is to be decremented through for the calls that must be implemented, as hereinbefore previously described. Then the step continues through the call alert cycles for the number of cycles that have been predetermined. In addition, if there are some additional reserve calls, they are accomplished at this step.

Upon completion of the data transmissions by the alerting sequences in step 462, the alert routine is decremented through a counting function at 464 which continues to "loop" the calls until all preselected number of calls have been made.

After the counter has reached "0" and all of the calls have been accomplished, the Executive Routine resumes control at 468 by branching back to the scan routine to monitor the status inputs for any new changes. In addition, between the call counting step 464 and the branch routine at 468, space has been reserved for a data base maintenance step 466 which may be accomplished if requested by specific application.

The initialization routine (see FIG. 14) is invoked at power up or upon restart of the remote telemetry unit at step 451. The routine is responsible for establishing the configuration of the two 8-bit microcomputer ports to support the 14 digital status inputs as well as the two digital outputs which are hardware configured for control of the DTMF transceiver 76 and a telephone line hook switch relay 230 as shown in step 452'.

After setting up the I/O ports, the initialization routine ensures that the DTMF 76 circuitry is RESET, and the telephone line is "on-hook." The final task of the initializer routine is to set up the transmit buffer with a customer-specified two-digit RTU ID NO. (or site code) and to fill the transmit data field with a succession of termination codes as shown at step 452''. The entire sequence of the initialization program is completed in about 250 microseconds whereupon control is returned to the scanning routine step 454 (see FIG. 13) at stop point 453.

Figure 15:
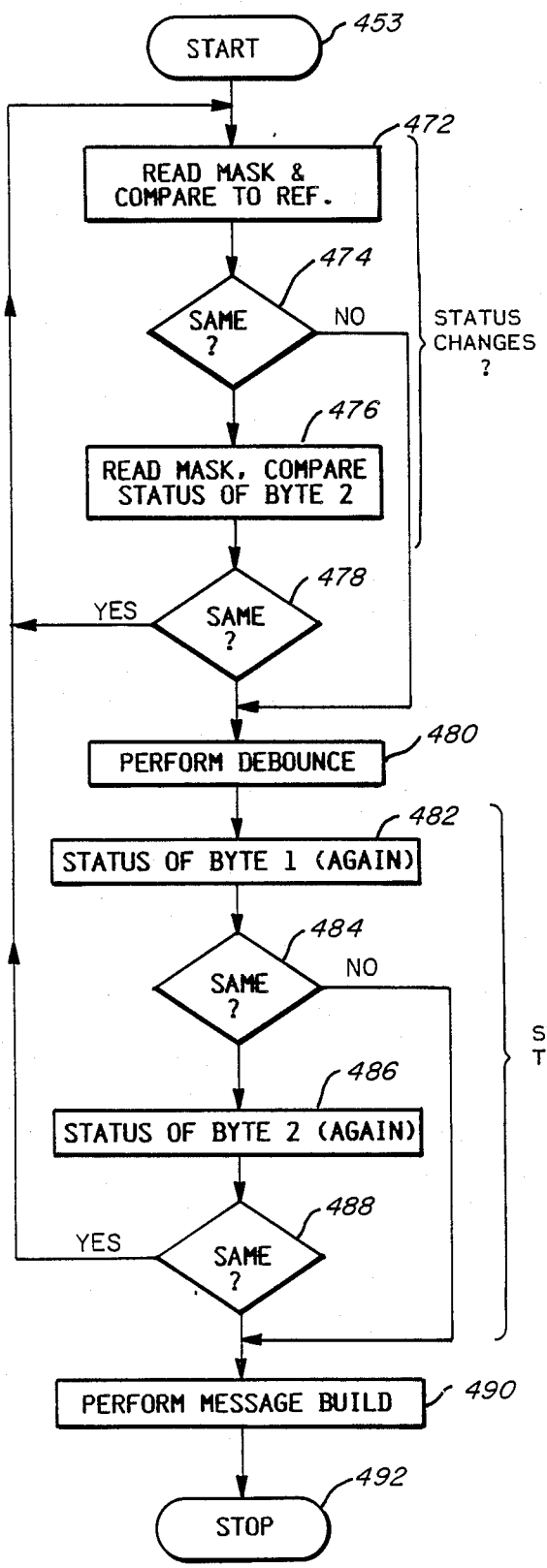
FIG. 15 is a program flow chart diagram of the "status scan" routine of the "executive" function shown in FIG. 13.
Figure 16:
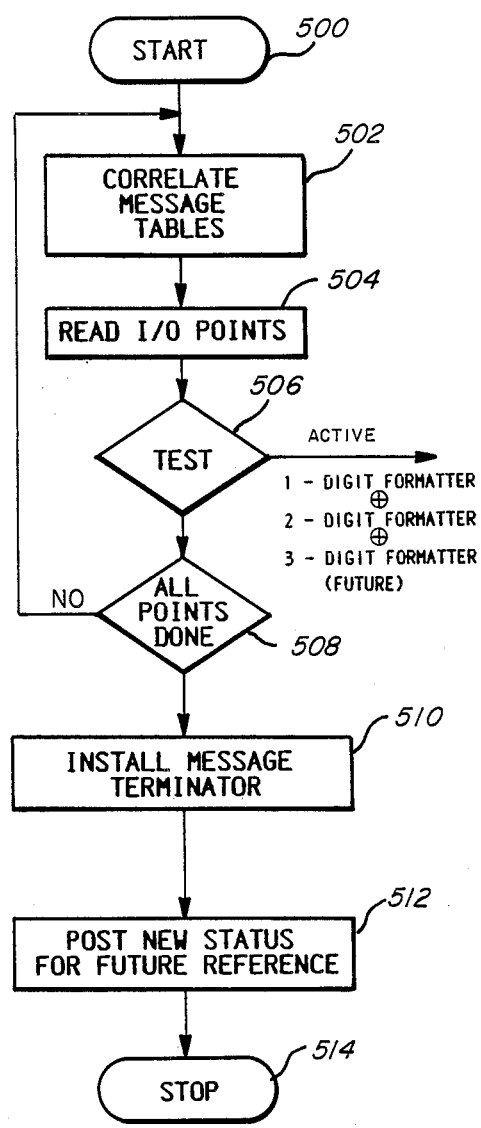
FIG. 16 is a program flow chart diagram of the "message build" routine of the "executive" function shown in FIG. 13.

Referring now to FIG. 15, the main function of the status scan routine, starting at start point 453 at the end of the initializer subroutine, is to verify valid or solid changes or deviations in the input status signals to the RTU unit 70 at lines 60, 62, 64 and 66. This is accomplished by taking repeated high speed readings of the input lines by reading the mask and comparing the input status signals to the previous reference status field stored in RAM 118 at step 472. The comparison is accomplished at step 474, and if the comparison indicates that the signals are the same, and no change or deviation has been made, the routine shifts to the next step 476 of reading the mask and comparing status byte no. 2, and accomplishing the comparison at step 478. If the input status signals are the same upon the second comparison, then the routine is looped back to step 472 to repeat the process again. However, if at step 474 the comparison indicates that the input status signal is different as compared to the previous reference values, then the routine shifts to step 480 which performs the "debounce" routine, resulting in the requirement that any status transmission signals must be stable for a controlled length of time before being accepted as valid. This "debounce" delay time eliminates false triggers caused by electrical noise on the sensory input lines.

Similarly, if the comparison at steps 476 and 478 indicate that the new status input signal differs from the previously stored reference signal, the routine moves to the debounce step 480 to accomplish the "debounce" routine as just described. After the debounce time delay has been accomplished, the status is again scanned in steps 482 and 484, and if it is the same, the routine is passed to a second status byte comparison that is accomplished at steps 486 and 488. If the status is again the same as the previously compared status references, then the loop is returned to step 472 to accomplish the status change scanning routines again. If, however, at either steps 484 or 488, the comparison indicates, after the "debounce" subroutine at 480, that there is a valid status change, then the routine shifts to step 490 which instructs the microprocessor to perform the message building routines, which will be hereinafter described in greater detail. After the message building step, the routine is stopped at 492 and control is returned to the Executive Routine to begin the reporting cycle with the alerting function step 462 (see FIG. 13).

The message building routine (see FIG. 16) builds the transmit message as a function of the I/O image and starts at 500. At the start of the message building routine, the valid status signal is correlated with the message table in step 502 for building the transmit message as a function of the I/O image. Beginning with status input no. 1, each point is examined in ascending numerical order in step 504. A pointer to a translation table is maintained to correlate points and message values when a point is found to be an alarm or deviation condition and it is tested in step 506 and a call is issued to a formatting subroutine by the "active" line. After all of the input status points have been examined and it is determined that all points have been tested as in step 508, then the routine shifts to the install message terminator code as in step 510.

The routine then moves to the final step 512 in which the new status of each of the points is posted to RAM 118 for future reference in new scanning cycles. If in step 508 all of the input points have not yet been tested, then the loop is recycled to step 502 to accomplish the message correlation and formatting of the digital message. At step 510, in addition to adding the required terminator, the routine 510 also resets the pointers for subsequent runs through the I/O images. After the new status has been posted by step 512, the routine stops at 514.

Figures 17, 18:
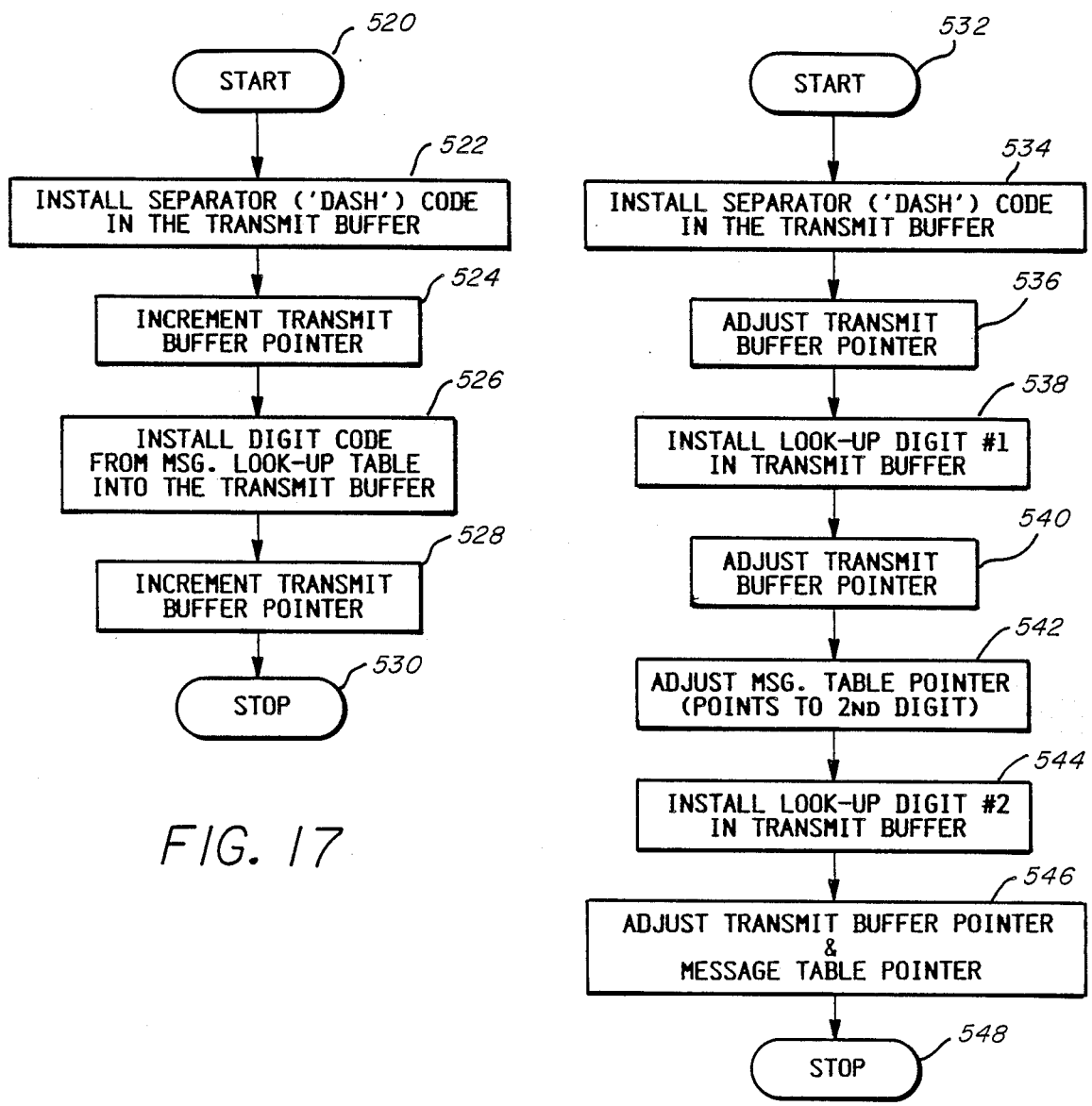
FIG. 17 is a program flow chart diagram of a "1-digit formatter" routine of the "message build" program shown in FIG. 15.
FIG. 18 is a program flow chart diagram of a "2-digit formatter" routine of the "message build" operation shown in FIG. 15.

The one-digit message formatter subroutine is shown in FIG. 17, and converts status point numbers into pager message characters and places these characters into the transmit buffer. The one-digit message formatter routine starts at 520, and in the next step 522, "dash" (—) codes are used to separate status codes in the pager message, as hereinbefore previously described. The transmit buffer pointer is incremented in step 524 and a single digit code is installed from the look-up table into the transmit buffer at step 526. The buffer pointer is kept at the next available message cell, while the table pointer is kept at the first digit of the next available conversion or "look-up" code. The transmit buffer pointer is incremented at step 528 until all characters in the message have been installed in the transmit buffer and then the routine is terminated at point 530.

In FIG. 18, a two-digit point number formatting routine is shown, starting at 532. The "dash" code is installed at step 534, the transmit buffer pointer is adjusted for the first digit at step 536, and the first digit is installed in the transmit buffer at step 538. The transmit buffer pointer is adjusted for the second digit at step 540. Then the message table pointer (that points to the second digit) is adjusted at 542 and the second digit is installed in transmit buffer in step 544. The transmit buffer pointer and message table pointer are adjusted for the next two-digit point number in step 546, and the routine is stopped at 548.

Figure 19:
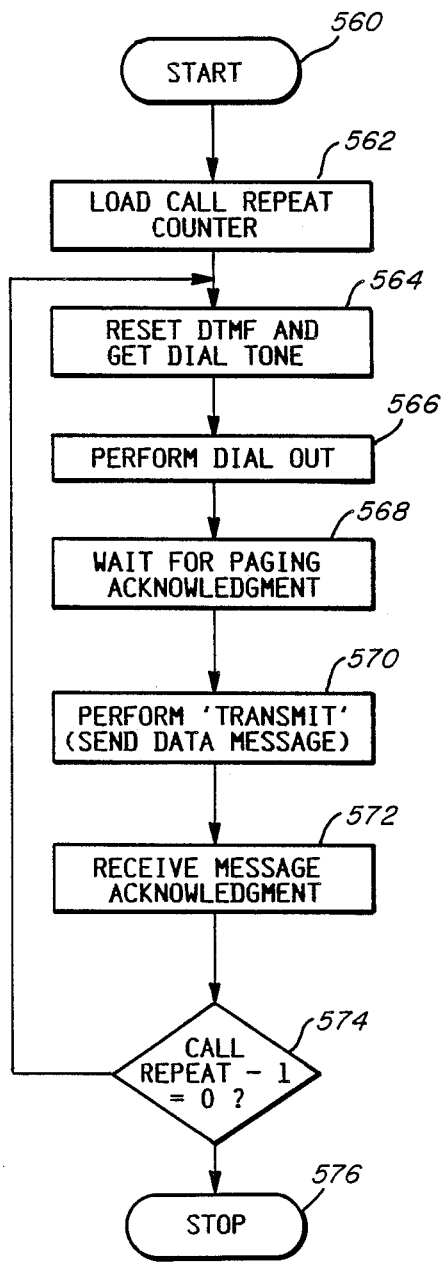
FIG. 19 is a program flow chart diagram of a typical "alert" routine of the "reporting cycle" function shown in FIG. 13.

A typical "Alert" routine is shown in FIG. 19 and is used to dispatch a system alarm message to any number of pagers in a customer-specified sequence. Each individual phone number can be called up to 256 times per alarm event as determined by the local repeat counter for each alert routine. When the alert routine is invoked a 560, the call repeat counter is loaded from the selected number of repeat calls that have been stored in RAM 118 by accomplishing step 562. A RESET signal is sent to the DTMF 76 circuit and the hook relay 230 is energized to permit a dial tone to be received from the telephone line 79/79' at step 564. Then a dial-out subroutine will be executed in sequence for dialing each telephone number in a preselected order. With each dial-out subroutine, any form of 800, long distance, 8 or 9+, PBX, PABX or DDD protocol may be specified, thus permitting world-wide monitoring networks to be readily implemented through the telephone line system.

In performing the dial-out subroutine at step 566, the next step 568 is performed, that of waiting for the radio pagers or cellular network computer 82 (see FIG. 1) to acknowledge receipt of the call. Once the pager acknowledgement has been accomplished at step 568, the transmit routine is accomplished at 570 in which the previously formatted data message is converted from a digital format by the DTMF circuit 76 to audio tone signals for transmission over the telephone lines. After the data message has been transmitted at step 570, a wait is accomplished for receiving the message acknowledgement which is keyed by the paging computer in response to the terminator code that was added to the formatted message. Once the message acknowledgement has been received at step 572, the call repeat counter is decremented at 574 and if necessary, that phone number will be called again for a repeat message before relinquishing control back to the Executive Routine at 576.

Figure 20:
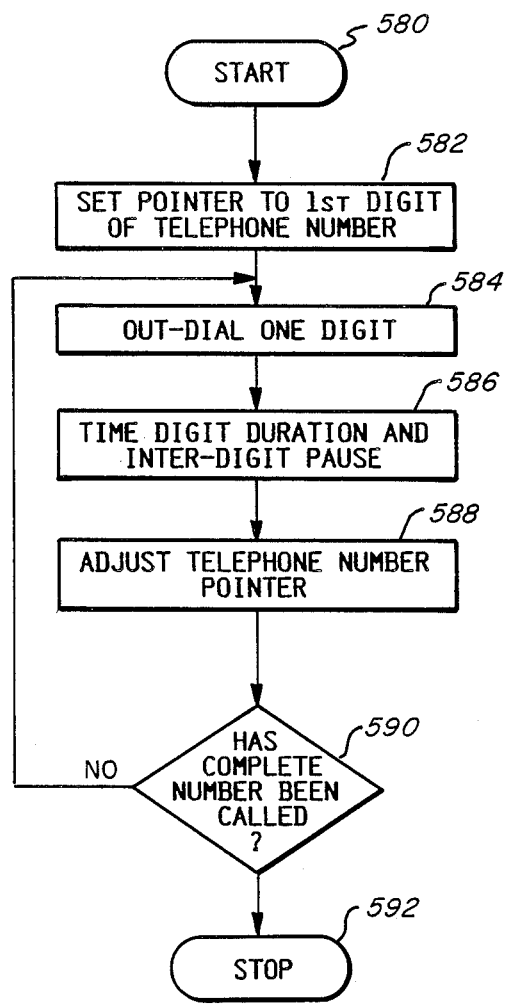
FIG. 20 is a program flow chart diagram of a typical "dial out" routine of the "reporting cycle" function shown in FIG. 13.

A typical "dial-out" subroutine is shown in FIG. 20 and is used to call the various customer-specified telephone numbers. These phone numbers are stored in a sequential file in the EPROM 128 referenced with the index register. The routine begins at 580 and the phone number digits are referenced in ascending order, and a pointer is set to the first digit of he telephone number in step 582, and the single digit is then dialed out in step 584. In step 586, a time duration is established for each digit, since the digit has been converted from a digital signal to an analog audio tone signal and an inter-digit pause is established for accommodating the telephone switching equipment.

After the first digital telephone number has been dialed out, the telephone number pointer is set to the second digit of the telephone number in step 588, and then a decision step at 590 is accomplished for determining whether all of the digits of the telephone number have been called. If the answer is no, the next digit is out-dialed at step 584 and the loop is repeated between steps 584 and 590 until all of the telephone number digits have been dialed. When the "dial-out" routine has been accomplished through step 590, the program control is shifted back to the active alert routine upon completion of the dialing sequence at 592.

The transmit routine (see FIG. 21) is responsible for delivering the complete alarm message, including termination code to the paging computer and starts at 600. The alarm message is formatted and stored in the transmit buffer by the message building routine and the message digits are transferred from the transmit buffer starting at step 602. Next, a digit from the transmit message buffer is sent to the DTMF circuit 76 at step 604. The digit duration is timed and an interdigit pause is timed at step 606. Then after the first digit has been sent to the DTMF circuit 76, a comparison step at 608 is made to determine whether the termination code was the last digit that had been sent. If the termination code has not yet been sent, then the routine moves to the next step 610 in which the transmit buffer pointer is moved to the next digit of the message and at 612 a branch loop is accomplished in which steps 604 through 610 are performed again to send the next digit of the formatted message. This loop is continuously accomplished until the termination code is detected at step 608 and the routine then is shifted to the next step of waiting to receive the message acknowledgement from the paging computer, as hereinbefore described. This is accomplished at step 614. Once the message acknowledgement has been received, the routine then disconnects the MPU 74 from the telephone line at step 616 by de-energizing the hook relay 230 in the telephone isolation and matching circuit 78. The routine is then terminated at 618.

The delay routines shown in FIG. 22 provide the crystal-controlled time base references with a resolution of 8 microseconds. Timing is provided for all Executive application functions. These include precise timing for the dialed digits as well as the transmitted digits, allowing various data rates and speed dialing specifications for optimal interfacing with any paging service computer system, and to provide the time delay for accomplishing the "debounce" routine to be accomplished in scanning the input status lines.

The "debounce" constants are tailored to he hardware device characteristics of the status input detection devices, and can be widely varied and precisely controlled. Note the multiplicative action of the constants as established by the algorithm in the delay routine as the routines are stepped through the loading of the previously selected delay constants, after startup at 630, through steps 632, 634 and 636. After each of the delay constants have been loaded, each of the constants are decremented through a counter and then compared to determine whether the counter has reached a zero count in companion steps 638-640, 642-644 and 646-648. If all of the delay constants have been decremented, the routine is terminated at 650, however, if any of the counters show that the delay time has not yet been fully decremented, then the routine is looped back to either continue to decrement the delay constant number 1, or to reload constants number 1 and number 2 to accomplish the desired time delay.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

TABLE 1

| Component Specifications | |
|---|---|
| Ref. No. | Specification |
| 74 | Motorola MC146805 (Alternatively - Motorola MC68HC11 MC68020 Intel 8080/8085/8086 or 8088 Zilog Z80) |
| 76 | SSI 20C90 or K212 |

TABLE 1-continued

| Component Specifications | |
|---|---|
| Ref. No. | Specification |
| 87 | ULN 2002 2003 2004 |
| 126 | Texas Instruments, Motorola and others 74HC373 |
| 128 | EPROM 27C64 or 27C128 or 27C256 |
| 163 | 0.01 uf |
| 170 | 470 ohms |
| 174 | 1 uf |
| 176 | 160 ohms |
| 178 | IN 4002 IN 4004 |
| 180 | 4N25 4N26 (or Hewlett Packard HCPL 3700) |
| 187 | 4.3 M |
| 188 | 22K |
| 190 | ULN 2002 2003 2004 |
| 192 | MOS LED |
| 198, 200, 202, 204 | 10K |
| 226 | Line transformer 50 ohm/180 ohm or 600'/600' |
| 227 | 100 ohms, ½ W |
| 228 | Zener 6.8 volts 1 W |

I claim:

1. In an automated telemetry paging system for providing remote pager notification of deviations in selected operating parameters measured at a specific site location wherein indication of each of the selected parameters and the unacceptable deviation therefrom is provided in the form of a plurality of electrical status signals each representative of one of the selected parameters, telephone company line connections to telephone central switching equipment for dialing selected telephone numbers is provided at the site location, and pager network communications equipment is provided that is in communication with the telephone central switching equipment and in communication with a plurality of paging devices, a remote telemetry unit located at the site location comprising a programmed microprocessor including
data input/output means,
  memory means,
  a central processing unit (CPU), and
  a real time clock,
status signal receiving means for receiving and isolating the received electrical status signals, said receiving means isolating said received signals for eliminating short duty-cycle over-voltage signals and shaping said received signals into digital signals representative of said received status signals, said digital signals applied as inputs to said input-/output means,
interrogation means controlled by said CPU and cooperating with said real time clock for continuously scanning said digital status signals applied to said input/output means at a predetermined rate,
discrimination means controlled by said CPU for reading and comparing said digital status signals applied to said input/output means against a current status signal reference stored in said memory means and in response to detecting a deviation therefrom initiating a time delay prior to again reading and comparing said digital status signals against said current status signal reference, and if said second comparison after said time delay detects a deviation from said reference signalling said CPU of the presence of a valid status signal indicating an unacceptable parameter deviation, formatting means controlled by said CPU for reading said digital status signals, correlating said digital signals with a message table preprogrammed into said memory means and converting said digital status signals appearing at said input/output means into a digital status message of a preselected format that is representative of the identification of the specific site location and successive codes indicating the parameters that have reached an unacceptable deviation, digital to multiple frequency (DTMF) conversion means for converting said digital status message generated by said formatting means to audio frequency signals for transmission over the telephone lines to said paging network equipment, and telephone interface means for interfacing between said DTMF conversion means and the telephone company line interconnected to the telephone central switching equipment for applying audio frequency telephone signals to the telephone lines for application to said telephone central switching equipment and the pager network equipment, wherein said CPU in response to said formatted digital status message reads digital signals stored in said memory means representative of a preselected number of pager telephone numbers and applies said digital signals in serial order to said DTMF conversion means for converting said signals representative of said pager telephone numbers to audio frequency signals for application through said telephone interface means and the telephone central switching equipment directly to the paging network equipment for automatically and sequentially dialing said preselected pager telephone numbers, and wherein said CPU further applies said digital status message in serial order to said DTMF conversion means for converting said digital signals to audio frequency signals for transmission over the telephone lines to the pager network equipment for broadcast to the paging devices for alphanumeric display and said digital status message therein in said preselected message format.

2. The remote telemetry unit as described in claim 1, wherein said CPU applies said digital status message signals to said DTMF conversion means only after receiving audio tone signals from the pager network equipment that the complete pager telephone number has been dialed and the pager is accessed.

3. The remote telemetry unit as described in claim 1, wherein said CPU automatically dials each of said preselected pager telephone numbers a predetermined number of times.

4. The remote telemetry unit as described in claim 1, wherein said memory means may be programmed to receive data representative of the selected deviation parameters for temporarily masking preselected ones of said deviation parameters during interrogation by said interrogation means.

5. The remote telemetry unit as described in claim 1, wherein said formatting means formats both single digit and multiple digit status codes for use in establishing said digital status message.

6. The remote telemetry unit as described in claim 1, wherein said current status signal reference is the last such status determined for each parameter and reported in a digital status message to said pagers and then stored in said memory means.

7. The remote telemetry unit as described in claim 1, wherein said status signal receiving means includes an optical coupling circuit means responsive to said received input status signals for optically isolating and limiting any spurious electrical spikes and over-voltage signals present in said received input status signals.

8. The remote telemetry unit as described in claim 7, wherein said status signal receiving means further includes an isolated source of electrical power for said optical coupling circuit means, and wherein said optical coupling circuit means acts as the load for said isolated power supply for causing said spurious electrical spikes and over-voltage signals to be routed to said isolated source of electrical power for absorbing such short-duty cycle over-voltage signals.

9. The remote telemetry means as described in claim 1, wherein said DTMF conversion means comprises a DTMF transceiver circuit.

10. The remote telemetry unit as described in claim 1, wherein said telephone interface means includes relay controlled hook-switch contacts for selectively interconnecting said DTMF conversion means audio frequency output signals to the telephone lines, said relay operable in response to an electrical control signal received from said CPU.

11. The remote telemetry unit as described in claim 1, wherein said time delay introduced by said discrimination means after the detection of a deviate status signal is preselected based on the characteristics of the means providing said electrical signals indicative of the measured parameter as well as the characteristics of the selected operating parameters and is a substantially long time period as compared to successive clock pulses.

12. The remote telemetry unit as described in claim 1, wherein the electrical status signals representative of the selected parameters and unacceptable deviation therefrom are provided by dry-contact switch closures the opening and closing thereof being indicative of said selected parameter and the unacceptable deviation therefrom.

13. In a telemetry paging system for providing remote pager notification of deviations in selected operating parameters measured at a specific site location wherein indication of each of the selected parameters and the unacceptable deviation therefrom is provided in the form of a plurality of electrical status signal each representative of one of the selected parameters, telephone company line connections to telephone central switching equipment for dialing selected telephone numbers is provided at the site location, and pager network communications equipment is provided that is in communication with the telephone central switching equipment and in communication with a plurality of paging devices, the improvement comprising telemetry means located at said site location and receiving said electrical status signals indicative of each of the selected parameters and any unacceptable deviation therefrom and in response thereto generating a status message identifying the remote site location and codes for indicating the deviated parameters and generating telephone audio tone messages representative of the status message for communicating with telephone computer switching and paging equipment, wherein said telemetry means comprises, status signal receiving means for receiving and isolating the signals received from said status means, said status signal receiving means isolating said signals for protecting said telemetry means from any spurious electrical spikes and over-voltage signal inputs, a programmed microprocessor (MPU) including a programmable expanded memory means, and digital to multiple frequency (DTMF) conversion means for converting digital status message signals generated by said MPU to audio frequency signals for transmission over the telephone lines, and telephone interface means for interfacing between said digital to multiple frequency conversion means and the telephone company line interconnected to the telephone office switching equipment in response to control signals from said MPU for interconnecting audio frequency telephone signals to the telephone lines for application to said telephone company switching equipment and the pager network equipment, wherein said MPU interrogates said received electrical status signals at a predetermined rate functionally related to the MPU clock rate and in response to the occurrence of a deviate status signal introducing a predetermined time delay before further interrogating said status signals for comparison with a previously determined status reference maintained in said MPU memory for determining whether said deviate status signal is an unacceptable parametric deviation, wherein said MPU in response to determining that an unacceptable status signal deviation has occurred generates a digital status message identifying the remote site location and the selected parametric deviation, and wherein said MPU energizes said telephone interface means when said digital stats message is completed and dials preselected pager telephone numbers stored in said expanded programmable memory means through the telephone central switching equipment and pager network equipment, and wherein said MPU further applies digital signals representative of said digital status message to said DTMF conversion means for converting said digital signals to audio frequency signals for transmission over the telephone lines to the pager network equipment for broadcast to the pager devices for displaying said digital status message therein.

14. The remote telemetry means as described in claim 13, wherein said MPU further automatically and sequentially dials said preselected number of remote pager telephone numbers stored in said expanded programmable memory means by applying digital signals representative of said telephone numbers to said DTMF conversion means for converting said digital signals to telephone audio tone dialing signals.

15. The remote telemetry means as described in claim 13, wherein said MPU applies said digital signals representative of said digital status message to said DTMF conversion means only after receiving audio tone signals from the pager network equipment that the complete pager telephone number has been dialed and the pager is accessed.

16. The remote telemetry means as described in claim 13, wherein said MPU automatically dials each of said preselected pager telephone numbers a preselected number of times.

17. The remote telemetry means as described in claim 13, wherein data representative of selected deviation parameters that are to be temporarily ignored at the site location is programmed into the MPU programmable memory for masking said selected deviation parameters during the MPU interrogation of said input electrical status signals.

18. The remote telemetry means as described in claim 13, wherein said MPU formats both single digit and multiple digit status codes for use in building said digital status message.

19. The remote telemetry means as described in claim 13, wherein said previously determined status reference is the last such status determined for each parameter and reported in a status message to said pagers and then stored in digital form in said MPU.

20. The remote telemetry means as described in claim 13, wherein said status signal receiving means includes an optical coupling circuit means responsive to said received input status signals for optically isolating and limiting any spurious electrical spikes and over-voltage signals present in said received input status signals.

21. The remote telemetry means as described in claim 20, wherein said status signal receiving means further includes an isolated source of electrical power for said optical coupling circuit means, and wherein said optical coupling circuit means acts as the load for said isolated power supply for causing said spurious electrical spikes and over-voltage signals to be routed to said isolated source of electrical power for absorbing such short-duty cycle over-voltage signals.

22. The remote telemetry means as described in claim 13, wherein said DTMF conversion means comprises a DTMF transceiver circuit.

23. The remote telemetry unit as described in claim 13, wherein said telephone interface means includes relay controlled hook-switch contacts for selectively interconnecting said DTMF conversion means audio frequency output signals to the telephone lines, said relay operable in response to an electrical control signal received from said MPU.

24. The remote telemetry unit as described in claim 13, wherein said time delay introduced by said discrimination means after the detection of a deviate status signal is preselected based on the characteristics of the means providing said electrical signals indicative of the measured parameter as well as the characteristics of the selected operating parameters and is a substantially long time period as compared to successive clock pulses.

25. The remote telemetry unit as described in claim 13, wherein the electrical status signals representative of the selected parameters and unacceptable deviation therefrom are provided by dry-contact switch closures the opening and closing thereof being indicative of said selected parameter and the unacceptable deviation therefrom.

26. In an automated telemetry system for providing remote notification of deviations in selected operating parameters measured at a specific site location wherein indication of each of the selected parameters and the unacceptable deviation therefrom is provided in the form of a plurality of electrical status signals each representative of one of the selected parameters, telephone company line connections to telephone control switching equipment for dialing selected telephone numbers is provided at the site location, and communications equipment is provided that is in communication with the telephone central switching equipment for providing remote notification of the parameter deviations on a real time basis, a remote telemetry unit (RTU) located at the site location comprising a programmed microprocessor including
  data input/output means,
  memory means,
  a central processing unit (CPU), and
  a real time clock,
dry-contact switch closures the opening and closure thereof being indicative of said selected operating parameters and the unacceptable deviation therefrom for generating electrical status signals representative thereof,
status signal receiving means for receiving and isolating the received electrical status signals, said receiving means including optical coupling circuit means responsive to said received input status signals for optically isolating and limiting any spurious electrical spikes and short duty-cycle over-voltage signals present in said received input status signals, said receiving means shaping said received signals into digital signals representative of said received status signals and applying said digital signals as inputs to said data input/output means, said status signal receiving means further including an isolated source of electrical power for said optical coupling circuit means and wherein said optical coupling circuit means acts as the load for said isolated power supply for causing said spurious electrical spikes and over-voltage signals to be routed to said isolated source of electrical power for absorbing such short-duty cycle over-voltage signals,
interrogation means controlled by said CPU and cooperating with said real time clock for continuously scanning said digital status signals applied to said data input/output means at a predetermined rate,
wherein data representative of selected deviation parameters that are to be temporarily ignored at the site location is programmed to said RTU memory means for masking said selected deviation parameters during interrogation by said interrogation means,
discrimination means controlled by said CPU for reading and comparing said digital status signals applied to said input/output means against a current status signal reference stored in said memory means and in response to detecting a deviation therefrom initiating a time delay prior to again reading and comparing said digital status signals against said current status signal reference, and if said second comparison after said time delay detects a deviation from said reference, signaling said CPU of the presence of a valid status signal indicating an unacceptable parameter deviation, wherein said time delay is preselected based on the characteristics of the dry-contact switch closure providing said electrical signals indicative of the selected measured parameters as well as the characteristics of the operating parameters and is a substantially long time period as compared to successive clock pulses.

formatting means controlled by said CPU for reading said digital status signals, correlating said digital signals with a message table preprogrammed into said memory means and converting said digital status signals appearing at said input/output means into a digital status message of a preselected format that is representative of the identification of the specific location and successive codes indicating the parameters that have reached an unacceptable deviation, said formatting means formatting both single digital and multiple status codes for use in establishing said digital status message, digital to multiple frequency conversion means for converting said digital status message generated by said formatting means to audio frequency signals for transmission over the telephone lines to said communications equipment, and telephone interface means for interfacing between said DTMF conversion means and the telephone company line interconnected to the telephone central switching equipment and including relay controlled hook-switch contacts for selectively interconnecting said DTMF conversion means audio frequency output signals to said telephone lines for application to said telephone central switching equipment and the communications equipment, said relay operable in response to an electrical control signal received from said CFU, wherein said CPU in response to said formatted digital status message reads digital signals stored in said memory means representative of preselected telephone numbers and applies said digital signals in serial order to said DTMF conversion means for converting said signals representative of said telephone numbers to audio frequency signals for application through said telephone interface means and the telephone central switching equipment for automatically and sequentially dialing said telephone numbers for reaching said communications equipment, and wherein said CPU further applies said digital status message in serial order to said DTMF conversion means for converting said digital signals to audio frequency signals for transmission over the telephone lines to the communications equipment for alphanumeric display of said digital status message therein in said preselected message format.

27. The remote telemetry system as described in claim 26, wherein said current status signal reference is the last such status determined for each parameter and reported in a digital status message to said communications equipment and then stored in said memory means.

28. The remote telemetry system as described in claim 26, wherein said DTMF conversion means comprises a DTMF transceiver circuit.

29. A telemetry unit for providing notification to remote pager network communications equipment of changes in selected operating parameters measured at a specified site location wherein each of the selected parameters and the changes therein are provided in the form of electrical status signals representative thereof, including a telephone line interconnected to telephone central switching equipment and interposed between said telemetry unit and the remote communications equipment, comprising a programmed microprocessor, including
    data input/output means,
    memory means,
    a central processing unit (CPU), and
    a real time clock,
status signal receiving and isolating the received electrical status signals, said receiving means including an optical coupling circuit means responsive to said received input status signal for optically isolating and limiting any spurious electrical spikes and short duty-cycle over-voltage signals present in said received input status signals, said receiving means shaping said received signals into digital signals representative of said received status signals and applying said digital signals as inputs to said input-/output means, said status signal receiving means further including an isolated source of electrical power for said optical coupling circuit means and wherein said optical coupling circuit means acts as the load for said isolated power supply for causing said spurious electrical spikes and over-voltage signals to be routed to said isolated source of electrical power for absorbing such short-duty cycle over-voltage signals,
interrogation means controlled by said CPU and cooperating with said real time clock for continuously scanning said digital status signals applied to said input/output means at a predetermined rate,
wherein data representative of selected deviation parameters that are to be temporarily ignored at the site location is programmed into said memory means for masking said selected deviation parameters during interrogation by said interrogation means,
discrimination means controlled by said CPU for reading and comparing said digital status signals applied to said input/output means against a current status signal reference stored in said memory means and in response detecting a deviation therefrom initiating a time delay prior to again reading and comparing said digital status signals against said current status signal reference, and if said second comparison after said time delay detects a deviation from said reference, signaling said CPU of the presence of a valid status signal indicating an unacceptable parameter deviation, wherein said time delay is preselected based on the characteristics of the means providing said electrical signals indicative of the selected measured parameters as well as the characteristics of the operating parameters and is a substantially long time period as compared to successive clock pulses,
formatting means controlled by said CPU for reading said digital status signals, correcting said digital signals with a message table preprogrammed into said memory means and converting said digital status signals appearing at said input/output means into digital status message of a preselected format that is representative of the identification of the specific location and successive codes indicating the parameters that have reached an unacceptable deviation, said formatting means formatting both single digit and multiple digit status codes for use in establishing said digital status message,
digital to multiple frequency (DTMF) conversion means for converting said digital status message generated by said formatting means to audio frequency signals for transmission over the telephone line to said remote communications equipment, and
telephone interface means for interfacing between said DTMF conversion means and the telephone company line interconnected to the telephone central switching equipment and including relay controlled hook-switch contacts for selectively interconnecting said DTMF conversion means audio frequency output signals to said telephone line for application to the remote pager network communications equipment, said relay operable in response to an electrical control signal received from said CPU,
wherein said CPU in response to said formatted digital status message reads digital signals stored in said memory means representative of a preselected number of pager telephone numbers and applies said digital signals in serial order to said DTMF conversion means for converting said signals representative of said pager telephone numbers to audio frequency signals for application through said telephone interface means and the telephone central switching equipment directly to the pager network communications equipment for automatically and sequentially dialing said preselected pager telephone numbers, and
wherein said CPU further applies said digital status message in serial order to said DTMF conversion means for converting said digital signals to audio frequency signals for transmission over the telephone lines to the pager network communications equipment for broadcast to the paging devices for alphanumeric display of said digital status message therein in said preselected message format, and
wherein said CPU automatically dials each of said pager telephone numbers a preselected number of times.

30. The telemetry unit as described in claim 29, wherein said current status signal reference is the last such status determined for each parameter and reported in a digital status message out through said communications means and then stored in said memory means.

31. The telemetry unit as described in claim 29, wherein said DTMF conversion means comprises a DTMF transceiver circuit.

* * * * *